United States Patent
Fujita et al.

(10) Patent No.: US 7,428,624 B2
(45) Date of Patent: Sep. 23, 2008

(54) HOST COMPUTER SYSTEM AND STORAGE SYSTEM HAVING A BANDWIDTH MANAGEMENT FUNCTION FOR STORAGE VOLUMES

(75) Inventors: Fumi Fujita, Fujisawa (JP); Masayuki Yamamoto, Sagamihara (JP); Naoko Maruyama, Kawasaki (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 11/498,135

(22) Filed: Aug. 3, 2006

(65) Prior Publication Data
US 2007/0283120 A1    Dec. 6, 2007

(30) Foreign Application Priority Data
May 31, 2006  (JP)  ............................ 2006-151692

(51) Int. Cl.
G06F 12/00  (2006.01)
G06F 13/00  (2006.01)

(52) U.S. Cl. .................. 711/170; 711/114; 709/213; 709/216; 709/232; 709/233; 710/28; 710/33; 710/60

(58) Field of Classification Search ............... 709/213, 709/216, 217, 218, 232, 233, 240; 710/8, 710/22, 28, 33, 36, 37, 40, 60; 711/112, 711/114, 147, 148, 151, 154, 158, 165, 170
See application file for complete search history.

(56) References Cited

U.S. PATENT DOCUMENTS

| 7,181,516 | B2 * | 2/2007 | Kaneda et al. | .............. 709/223 |
| 2004/0205166 | A1 * | 10/2004 | DeMoney | .................... 709/219 |
| 2005/0022201 | A1 | 1/2005 | Kaneda et al. | |
| 2005/0144384 | A1 | 6/2005 | Eguchi et al. | |
| 2006/0206682 | A1 * | 9/2006 | Manbert et al. | .............. 711/170 |
| 2006/0248307 | A1 * | 11/2006 | Yamamoto et al. | .......... 711/170 |
| 2008/0046610 | A1 * | 2/2008 | Tripathi et al. | ................. 710/36 |
| 2008/0104339 | A1 * | 5/2008 | Nakagawa et al. | .......... 711/154 |

FOREIGN PATENT DOCUMENTS

JP    2005-025422    1/2005
JP    2005-209149    8/2005

* cited by examiner

*Primary Examiner*—Jack A Lane
(74) *Attorney, Agent, or Firm*—Antonelli, Terry, Stout & Kraus, LLP.

(57) ABSTRACT

Provided is a computer system including a plurality of data storage apparatus and manages a bandwidth of a data storage apparatus according to an attribute of a storage volume. A storage system includes an interface for processing access to the storage volume from a host computer, and a control unit for controlling allocation of the storage volume to the host computer. A management computer transmits a request of setting a bandwidth to be accessed by the host computer via the interface in the storage volume to the storage system. The control unit sets the bandwidth corresponding to a ratio of processing access to each storage volume in the storage system based on the request from the management computer, and allocates the storage volume having the bandwidth requested by the host computer set therein to the host computer to be accessed by the host computer to the allocated storage volume.

13 Claims, 41 Drawing Sheets

| FC INTERFACE ID | STORAGE VOLUME ID | HOST COMPUTER WWN |
|---|---|---|
| 150 | 132 | 351 |
|  |  |  |
|  |  |  |

STORAGE VOLUME CONFIGURATION TABLE 122

FIG. 2

| 1241 | 1242 | 1243 | 1244 | 1245 | 1246 | 1247 |
|---|---|---|---|---|---|---|
| STORAGE VOLUME ID | CAPACITY | DATA ACCESS RATE (BANDWIDTH) | SETTING DATE | UPDATING TIMING | UPDATED BANDWIDTH | MINIMUM BANDWIDTH |
| 132 | 100GB | 65% | 2006/01/01 00:00 | 1 MONTH | −10% | 25% |
| | | | | | | |
| | | | | | | |

STORAGE VOLUME ATTRIBUTE TABLE 124

FIG. 3

FC INTERFACE MANAGEMENT TABLE 126

| STORAGE VOLUME ID | CAPACITY | DATA ACCESS RATE (BANDWIDTH) | SETTING DATE | UPDATING TIMING | UPDATED BANDWIDTH | MINIMUM BANDWIDTH |
|---|---|---|---|---|---|---|
| 132 | 100GB | 55 % | 2006/01/01 00:00 | 1 MONTH | −10% | 25 % |
| 134 | 50GB | 30 % | 2006/01/01 00:00 | 1 MONTH | −10% | 20 % |
| | | | | | | |

STORAGE VOLUME ATTRIBUTE TABLE 124

FIG. 10

| 1221 | 1222 | 1223 |
|---|---|---|
| FC INTERFACE ID | STORAGE VOLUME ID | HOST COMPUTER WWN |
| 150 | 132 | 351 |
| 150 | 134 | 352 |
|  |  |  |

STORAGE VOLUME CONFIGURATION TABLE 122

FIG. 11

| 1241 | 1242 | 1243 | 1244 | 1245 | 1246 | 1247 |
|---|---|---|---|---|---|---|
| STORAGE VOLUME ID | CAPACITY | DATA AC RATE (BANDWIDTH) | SETTING DATE | UPDATING TIMING | UPDATED BANDWIDTH | MINIMUM BANDWIDTH |
| 132 | 100GB | 45 % | 2006/03/01 00:00 | 1 MONTH | −10% | 25 % |
| 134 | 50GB | 20 % | 2006/03/01 00:00 | 1 MONTH | −10% | 20 % |
|  |  |  |  |  |  |  |

STORAGE VOLUME ATTRIBUTE TABLE 124

FIG. 12

| 1241 | 1242 | 1243 | 1244 | 1245 | 1246 | 1247 |
| --- | --- | --- | --- | --- | --- | --- |
| STORAGE VOLUME ID | CAPACITY | DATA ACCESS RATE (BANDWIDTH) | SETTING DATE | UPDATING TIMING | UPDATED BANDWIDTH | MINIMUM BANDWIDTH |
| 132 | 100GB | 45 % | 2006/03/01 00:00 | 1 MONTH | −10 % | 25 % |
| 134 | 50GB | 20 % | 2006/03/01 00:00 | 1 MONTH | −10 % | 20 % |
| 135 | 100GB | 40 % | 2006/03/01 00:00 | 2 MONTHS | −5 % | 20 % |

STORAGE VOLUME ATTRIBUTE TABLE 124

FIG. 13

| FC INTERFACE ID 1221 | STORAGE VOLUME ID 1222 | HOST COMPUTER WWN 1223 |
|---|---|---|
| 150 | 132 | 351 |
|  |  |  |
|  |  |  |

STORAGE VOLUME CONFIGURATION TABLE 122

FIG. 14

| FC INTERFACE ID | STORAGE VOLUME ID | HOST COMPUTER WWN |
|---|---|---|
| 150 | 132 | 351 |
| 150 | 135 | 351 |
|  |  |  |

1221 · 1222 · 1223

STORAGE VOLUME CONFIGURATION TABLE  122

FIG. 15

| 1241 | 1242 | 1243 | 1244 | 1245 | 1246 | 1247 |
|---|---|---|---|---|---|---|
| STORAGE VOLUME ID | CAPACITY | DATA ACCESS RATE (BANDWIDTH) | SETTING DATE | UPDATING TIMING | UPDATED BANDWIDTH | MINIMUM BANDWIDTH |
| 132 | 100GB | 35 % | 2006/04/01 00:00 | 1 MONTH | −10 % | 25 % |
| 134 | 50GB | 20 % | 2006/04/01 00:00 | 1 MONTH | −10 % | 20 % |
| 135 | 100GB | 40 % | 2006/03/01 00:00 | 2 MONTHS | −5 % | 20 % |

STORAGE VOLUME ATTRIBUTE TABLE 124

FIG. 16

| FC INTERFACE ID (1221) | STORAGE VOLUME ID (1222) | HOST COMPUTER WWN (1223) |
| --- | --- | --- |
| 150 | 132 | 351 |
| 150 | 135 | 351 |
| 150 | 134 | 352 |

STORAGE VOLUME CONFIGURATION TABLE  122

FIG. 17

| 1221 | 1222 | 1223 | 2221 | 2222 | 2223 |
|---|---|---|---|---|---|
| FC INTERFACE ID | STORAGE VOLUME ID | HOST COMPUTER WWN | EXTERNAL INTERFACE ID | ETERNAL DATA STORAGE APPARATUS ID | EXTERNAL STORAGE VOLUME ID |
| 250 | 232 | 351 | | | |
| 250 | 234 | 352 | | | |
| 250 | 236 | | 255 | | |

STORAGE VOLUME CONFIGURATION TABLE 222

FIG. 20

| FC INTERFACE ID (1221) | STORAGE VOLUME ID (1222) | HOST COMPUTER WWN (1223) | EXTERNAL INTERFACE ID (2221) | ETERNAL DATA STORAGE APPARATUS ID (2222) | EXTERNAL STORAGE VOLUME ID (2223) |
|---|---|---|---|---|---|
| 450 | 436 |  | 455 |  |  |
|  |  |  |  |  |  |
|  |  |  |  |  |  |

STORAGE VOLUME CONFIGURATION TABLE 422

*FIG. 21*

| FC INTERFACE ID | STORAGE VOLUME ID | HOST COMPUTER WWN |
|---|---|---|
| 150 | 136 | |
| 150 | 137 | |
| | | |

1221 → FC INTERFACE ID
1222 → STORAGE VOLUME ID
1223 → HOST COMPUTER WWN

STORAGE VOLUME CONFIGURATION TABLE  122

FIG. 22

| STORAGE VOLUME ID (1241) | REAL/ VIRTUAL FLAG (2241) | CAPACITY (1242) | DATA ACCESS RATE (BANDWIDTH) (1243) | SETTING DATE (1244) | UPDATING TIMING (1245) | UPDATED BANDWIDTH (1246) | MINIMUM BANDWIDTH (1247) |
|---|---|---|---|---|---|---|---|
| 232 | REAL | 100GB | 65 % | 2006/01/01 00:00 | 1 MONTH | −10 % | 25 % |
| 234 | REAL | 50GB | 30 % | 2006/01/10 15:00 | 2 MONTHS | −5 % | 20 % |
| 236 | VIRTUAL | | | | | | |

STORAGE VOLUME ATTRIBUTE TABLE 224

FIG. 23

| STORAGE VOLUME ID | REAL/ VIRTUAL FLAG | CAPACITY | DATA ACCESS RATE (BANDWIDTH) | SETTING DATE | UPDATING TIMING | UPDATED BANDWIDTH | MINIMUM BANDWIDTH |
|---|---|---|---|---|---|---|---|
| 436 | VIRTUAL | | | | | | |
| | | | | | | | |
| | | | | | | | |

STORAGE VOLUME ATTRIBUTE TABLE 424

FIG. 24

| 1241 | 1242 | 1243 | 1244 | 1245 | 1246 | 1247 |
|---|---|---|---|---|---|---|
| STORAGE VOLUME ID | CAPACITY | DATA ACCESS RATE (BANDWIDTH) | SETTING DATE | UPDATING TIMING | UPDATED BANDWIDTH | MINIMUM BANDWIDTH |
| 136 | 100GB | 60 % | 2006/01/30 12:00 | 1 MONTH | −10 % | 20 % |
| 1374 | 50GB | 30 % | 2006/01/05 00:00 | 2 MONTHS | −5 % | 20 % |
|  |  |  |  |  |  |  |

STORAGE VOLUME ATTRIBUTE TABLE 124

FIG. 25

| STORAGE VOLUME ID | REAL/ VIRTUAL FLAG | CAPACITY | DATA ACCESS RATE (BANDWIDTH) | SETTING DATE | UPDATING TIMING | UPDATED BANDWIDTH | MINIMUM BANDWIDTH |
|---|---|---|---|---|---|---|---|
| 436 | VIRTUAL | 100GB | 60 % | 2006/01/30 12:00 | 1 MONTH | −10 % | 20 % |
|  |  |  |  |  |  |  |  |
|  |  |  |  |  |  |  |  |

STORAGE VOLUME ATTRIBUTE TABLE  424

FIG. 27

| FC INTERFACE ID | STORAGE VOLUME ID | HOST COMPUTER WWN | EXTERNAL INTERFACE ID | ETERNAL DATA STORAGE APPARATUS ID | EXTERNAL STORAGE VOLUME ID |
|---|---|---|---|---|---|
| 450 | 436 | 350 | 455 | 100 | 136 |
| | | | | | |
| | | | | | |

1221, 1222, 1223, 2221, 2222, 2223

STORAGE VOLUME CONFIGURATION TABLE 422

FIG. 28

| 1221 | 1222 | 1223 |
|---|---|---|
| FC INTERFACE ID | STORAGE VOLUME ID | HOST COMPUTER WWN |
| 150 | 136 | 455 |
| 150 | 137 | |
| | | |

STORAGE VOLUME CONFIGURATION TABLE 122

FIG. 29

| STORAGE VOLUME ID | REAL/VIRTUAL FLAG | CAPACITY | STORAGE VOLUME TIER |
|---|---|---|---|
| 637 | REAL | 100GB | 1 |
| 638 | VIRTUAL | 50GB | 2 |
|  |  |  |  |

STORAGE VOLUME ATTRIBUTE TABLE 624

FIG. 32

| MIGRATION SOURCE STORAGE VOLUME ID | VIRTUALIZED DATA STORAGE ID | MIGRATION DESTINATION STORAGE VOLUME ID |
|---|---|---|
| 637 | 638 | 138 |
| | | |
| | | |

6281, 6282, 6283

DATA MIGRATION MANAGEMENT TABLE 628

FIG. 33

| STORAGE VOLUME TIER (6245) | DATA ACCESS RATE (BANDWIDTH) (6246) |
|---|---|
| 1 | 60 % |
| 2 | 30 % |
| 3 OR LOWER | 10 % |

BANDWIDTH MANAGEMENT TABLE BY TIER   6244

FIG. 34

| FC INTERFACE ID (1221) | STORAGE VOLUME ID (1222) | HOST COMPUTER WWN (1223) | EXTERNAL INTERFACE ID (2221) | ETERNAL DATA STORAGE APPARATUS ID (2222) | EXTERNAL STORAGE VOLUME ID (2223) |
|---|---|---|---|---|---|
| 650 | 637 | 350 | | | |
| 650 | 638 | 350 | 655 | 100 | 138 |
| | | | | | |

STORAGE VOLUME CONFIGURATION TABLE  622

FIG. 36

| FC INTERFACE ID | STORAGE VOLUME ID | HOST COMPUTER WWN | EXTERNAL INTERFACE ID | EXTERNAL DATA STORAGE APPARATUS ID | EXTERNAL STORAGE VOLUME ID |
|---|---|---|---|---|---|
| 650 | 638 | 350 | 655 | 100 | 138 |
| | | | | | |
| | | | | | |

STORAGE VOLUME CONFIGURATION TABLE 622

*FIG. 37*

| FC INTERFACE ID<br>1221 | VIRTUALIZED STORAGE VOLUME ID<br>8221 | STORAGE VOLUME ID<br>1222 | HOST COMPUTER WWN<br>1223 |
|---|---|---|---|
| 150 | 1320 | 132 | 351 |
|  |  |  |  |
|  |  |  |  |

STORAGE VOLUME CONFIGURATION TABLE 822

*FIG. 39*

| FC INTERFACE ID (1221) | VIRTUALIZED STORAGE VOLUME ID (8221) | STORAGE VOLUME ID (1222) | HOST COMPUTER WWN (1223) |
|---|---|---|---|
| 150 | 1320 | | 351 |
| | | | |
| | | | |

STORAGE VOLUME CONFIGURATION TABLE 822

FIG. 40

| FC INTERFACE ID 1221 | VIRTUALIZED STORAGE VOLUME ID 8221 | STORAGE VOLUME ID 1222 | HOST COMPUTER WWN 1223 |
|---|---|---|---|
| 150 | 1320 | 134 | 351 |
|  |  |  |  |
|  |  |  |  |

STORAGE VOLUME CONFIGURATION TABLE 822

*FIG. 41*

HOST COMPUTER SYSTEM AND STORAGE SYSTEM HAVING A BANDWIDTH MANAGEMENT FUNCTION FOR STORAGE VOLUMES

CLAIM OF PRIORITY

The present application claims priority from Japanese application P2006-151692 filed on May 31, 2006, the content of which is hereby incorporated by reference into this application.

BACKGROUND OF THE INVENTION

This invention relates to a bandwidth management method for a data storage apparatus performed based on attributes of storage volumes in a computer system including a plurality of data storage apparatuses.

Information lifecycle management for managing data corresponding to a change in value of the data with a passage of time after the data is generated, has been operated in a computer system for storing the data. According to the information lifecycle management, data is managed to give priority to access to highly important data which has just been created and to suppress access to data becoming less important by a drop in access frequency with a passage of time after creation of the data. To realize the information lifecycle management, a data storage apparatus capable of responding to access from a client host computer to highly important data at a high speed and of suppressing a bandwidth for access to less important data, must be provided.

The number of pieces of data to be subjected to information lifecycle management is increasing, and these data are stored in a plurality of storage volumes of a large data storage apparatus like a disk array.

As a management method of such a large data storage apparatus, a storage system has been disclosed which includes a plurality of logical data storage apparatuses, a target device to be accessed by a host computer, and a juke box control mechanism for mapping the target device with one of the plurality of logical data storage apparatuses, and the juke box control mechanism changes the logical storage apparatus mapped with the target device according to a request from the host computer (refer to JP 2005-209149 A). According to this storage system, data different in passage of time after generation are stored in different storage volumes, and the different storage volumes can be allocated to the host computer.

There has also been disclosed a data storage apparatus which includes a storage volume capable of storing data accessed by a host computer, an access processing module for controlling data access between the host computer and the storage volume, a management interface for receiving a request of allocating the storage volume to the host computer from a management computer, a storage volume allocation module for allocating an unallocated storage volume to the host computer according to the storage volume attach request so that it can be accessed by the host computer, and a performance allocation module for allocating performance of a target module which influences data access between the host computer and the allocated storage volume (refer to JP 2005-025422 A).

SUMMARY OF THE INVENTION

A problem will be described by taking an example of a computer system which attaches a plurality of storage volumes storing data classified based on creation time to a port of a data storage apparatus and provides the data to a host computer. A plurality of storage volumes may share one port. For example, in a case where the host computer serves as a mail archive server, mail data of different creation time are stored in different storage volumes. These different storage volumes are connected to the host computer via the port. To be more specific, a storage volume storing mail data of January of 2006, a storage volume storing mail data of February 2006, and a storage volume storing mail data of March 2006 are accessed from the host computer via the port of the data storage apparatus. In this case, the passage of time after creation is greater for the mail data of January 2006 than that of March 2006, and importance is lower. Hence, priority must be given to access to the mail data of March 2006.

However, in the case of the technology disclosed in JP 2005-209149 A, it is impossible to set a bandwidth according to the storage volume. Thus, when it occurs, concentration of access to the mail data (storage volume) of January creates a problem of a drop in access to the mail data (storage volume) of March to which priority should be given.

When the technology disclosed in JP 2005-025422 A is used, access (bandwidth) can be controlled by a host computer which accesses the storage volume. However, when the mail data (storage volume) of January and the mail data (storage volume) of March are accessed from the same host computer, access priority cannot be set for each storage volume.

It is therefore an object of this invention to provide a computer system capable of guaranteeing bandwidth performance of a storage volume by setting a bandwidth for each storage volume and of automatically updating the bandwidth according to importance of the storage volume, and a bandwidth management method. When a storage volume is attached to a port, an access path from a host computer is decided with consideration given to a bandwidth of an attached storage volume, thereby enabling optimal distribution of performance of the port of the data storage apparatus.

According to an aspect of this invention, there is provided a computer system including a host computer, a storage system connected to the host computer via a network and having a storage volume to be accessed by the host computer, and a management computer for managing the host computer and the storage volume. The storage system includes an interface for process for access to the storage volume from the host computer, and a control unit for controlling allocation of the host computer and the storage volume. The management computer transmits a request of setting a bandwidth to be accessed by the host computer via the interface in the storage volume to the storage system. The control unit sets the bandwidth corresponding to a ratio of process for access to each the storage volume in the storage system based on the request from the management computer, and allocates the storage volume having the bandwidth requested by the host computer set therein to the host computer to enable access of the host computer to the allocated storage volume.

By allocating the storage volume corresponding to the access bandwidth requested by the host computer to the same, it is possible to manage the bandwidth of the storage volume accessed by the host computer by a storage volume unit.

BRIEF DESCRIPTION OF THE DRAWINGS

FIG. 2 is an explanatory diagram showing an example of a storage volume configuration table according to the first embodiment of this invention.

FIG. 3 is an explanatory diagram showing an example of a storage volume attribute table according to the first embodiment of this invention.

FIG. 10 is an explanatory diagram showing an example of an updated storage volume attribute table according to the first embodiment of this invention.

FIG. 11 is an explanatory diagram showing an example of an updated storage volume configuration table according to the first embodiment of this invention.

FIG. 12 is an explanatory diagram showing an example of an updated storage volume attribute table according to the first embodiment of this invention.

FIG. 13 is an explanatory diagram showing an example of an updated storage volume attribute table according to the first embodiment of this invention.

FIG. 14 is an explanatory diagram showing an example of an updated storage volume configuration table according to the first embodiment of this invention.

FIG. 15 is an explanatory diagram showing an example of an updated storage volume configuration table according to the first embodiment of this invention.

FIG. 16 is an explanatory diagram showing an example of an updated storage volume attribute table according to the first embodiment of this invention.

FIG. 17 is an explanatory diagram showing an example of an updated storage volume configuration table according to the first embodiment of this invention.

FIG. 20 is an explanatory diagram showing an example of a storage volume attribute table according to the second embodiment of this invention.

FIG. 21 is an explanatory diagram showing an example of a storage volume configuration table according to the second embodiment of this invention.

FIG. 22 is an explanatory diagram showing an example of a storage volume configuration table according to the second embodiment of this invention.

FIG. 23 is an explanatory diagram showing an example of a storage volume attribute table according to the second embodiment of this invention.

FIG. 24 is an explanatory diagram showing an example of a storage volume attribute table according to the second embodiment of this invention.

FIG. 25 is an explanatory diagram showing an example of a storage volume attribute table according to the second embodiment of this invention.

FIG. 27 is an explanatory diagram showing an example of an updated storage volume attribute table according to the second embodiment of this invention.

FIG. 28 is an explanatory diagram showing an example of an updated storage volume configuration table according to the second embodiment of this invention.

FIG. 29 is an explanatory diagram showing an example of an updated storage volume configuration table according to the second embodiment of this invention.

FIG. 32 is an explanatory diagram showing an example of a storage volume attribute table according to the third embodiment of this invention.

FIG. 33 is an explanatory diagram showing an example of a data migration management table according to the third embodiment of this invention.

FIG. 34 is an explanatory diagram showing an example of a bandwidth management table by tier according to the third embodiment of this invention.

FIG. 36 is an explanatory diagram showing an example of an updated storage volume configuration table according to the third embodiment of this invention.

FIG. 37 is an explanatory diagram showing an example of an updated storage volume configuration table according to the third embodiment of this invention.

FIG. 39 is an explanatory diagram showing an example of a storage volume configuration table according to the third embodiment of this invention.

FIG. 40 is an explanatory diagram showing an example of an updated storage volume configuration table according to the third embodiment of this invention.

FIG. 41 is an explanatory diagram showing an example of an updated storage volume configuration table according to the third embodiment of this invention.

DETAILED DESCRIPTION OF THE PREFERRED EMBODIMENTS

The preferred embodiments of this invention will be described below with reference to the accompanying drawings.

First Embodiment

Figure 1:
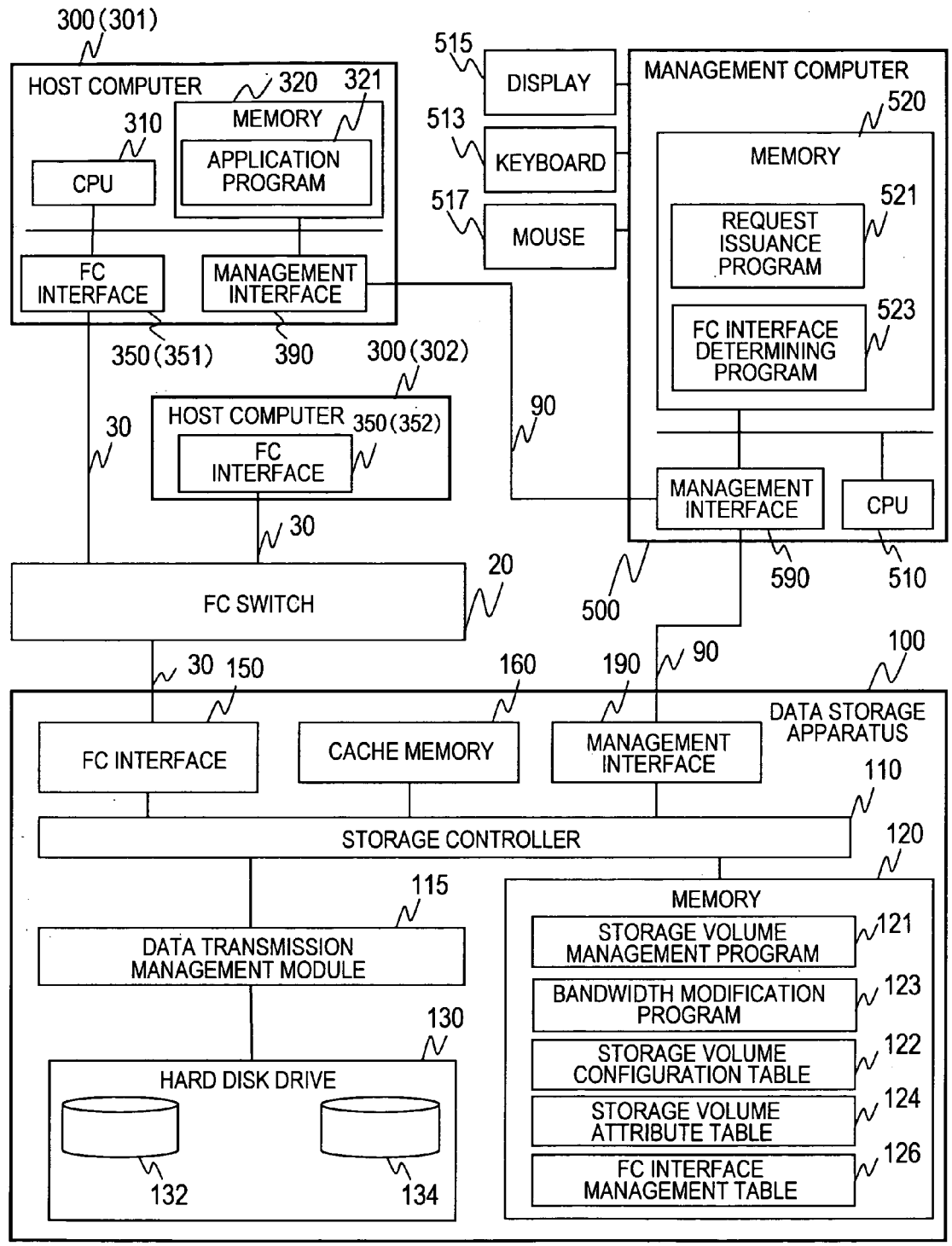
FIG. 1 is a block diagram showing a configuration of a computer system according to a first embodiment of this invention.

FIG. 1 is a block diagram showing a configuration of a computer system according to a first embodiment of this invention.

In the computer system shown in FIG. 1, two host computers 300 are connected to a data storage apparatus 100 via a fibre channel switch (hereinafter referred to as FC switch) 20.

Hereinafter, when the two host computers are differentiated from each other, these computers will be referred to as host computers 301 and 302. The host computer 300 and the FC switch 20, and the FC switch 20 and the data storage apparatus 100 are interconnected via a storage area network (abbreviated to SAN) 30. The computer system includes a management computer 500. The management computer 500 manages allocation/unallocation (release) of a storage volume of the data storage apparatus 100. The management computer 500 and the data storage apparatus 100, and the management computer 500 and the host computer 300 are interconnected via a management network 90. It should be noted that this invention is not limited by the number of host computers or data storage apparatus.

The host computer 300 includes a CPU 310 for executing programs, a memory 320 for storing the programs executed by the CPU 310 or data used by the programs, a fibre channel interface (hereinafter referred to as FC interface) 350, and a management interface 390 for transmitting/receiving data with the management computer 500. The memory 320 stores an application program 321.

The application program 321 is executed by the CPU to request the data storage apparatus 100 to read/write data via the FC interface 350, or to receive report of allocation/unallocation of a storage volume from the management computer 500 via the management interface 390. The host computer 300 stores the application program 321 itself, data necessary for executing the program, or data generated by executing the program in the data storage apparatus 100 via the FC interface 350, or obtains the data from the data storage apparatus 100 via the FC interface 350.

Such programs are loaded into the memory 320 at the time of starting the host computer 300, and executed by the CPU 310 to realize their functions. The FC interface 350 includes an identification number called a world wide name (hereinafter abbreviated to WWN). A unique number is allocated to the WWN for each FC interface. Upon reception of a request, the data storage apparatus 100 can judge which of the FC interfaces 350 has issued the request by referring to the WWN contained in the request. The WWN is generally constituted of 8-byte data. However, in this embodiment, for simplicity, description will be made by setting a reference numeral (351 in the case of the host computer 301, and 352 in the case of the host computer 302) of the FC interface as an identification number of a WWN.

The data storage apparatus 100 includes an FC interface 150 connected to the host computer 300, a management interface 190 connected to the management computer 500 via the management network 90, a cache memory 160 for temporarily storing data received from the host computer 300, a storage controller 110 for processing a request from the host computer 300 or a control request of a storage volume from the management computer 500, a data transmission management module 115 for controlling data transmission between the data storage apparatus 100 and the FC interface 350, a hard disk drive 130 for providing a storage volume to store data or a program used by the host computer 300, and a memory 120 for storing programs used by the data storage apparatus 100 or data necessary for executing the program.

The memory 120 stores a storage volume management program 121 and a bandwidth modification program 123. The storage controller 110 executes the storage volume management program 121 and the bandwidth modification program 123 to execute their functions. The memory 120 stores a storage volume configuration table 122, a storage volume attribute table 124, an FC interface management table 126, and the like used by the storage volume management program 121 and the bandwidth modification program 123.

For the hard disk drive 130, one or more logical volumes are created from a plurality of physical disk apparatuses through RAID configuration. A part or all of these volumes are created as storage volumes to be accessed by the host computer 300. In the example shown in FIG. 1, storage volumes 132 and 134 are created in the hard disk drive 130.

The hard disk drive 130 of the data storage apparatus 100 may not be installed inside the data storage apparatus 100. The hard disk drive 130 may be installed outside the data storage apparatus 100 to be accessed by the storage controller 110 and the data transmission management module 115.

The management computer 500 includes a CPU 510 for executing programs, a memory 520 for storing the programs executed by the CPU 510 or data, and a management interface 590 connected to the host computer 300 or the data storage apparatus 100 via the management network 90.

The management computer 500 further includes a display 515 for presenting necessary information to an administrator or displaying a screen used by the administrator, a keyboard 513 and a mouse 517 for receiving an instruction from the administrator. The memory 520 stores a request issuance program 521 and an FC interface determining program 523. The CPU 510 executes the request issuance program 521 and the FC interface determining program 523 to execute their functions.

FIG. 2 is an explanatory diagram showing an example of the storage volume configuration table 122.

The storage volume configuration table 122 stores pieces of information on a storage volume and the host computer 300 which permits access to the storage volume. The storage volume configuration table 122 is constituted of one or more records including an FC interface ID column 1221, a storage volume ID column 1222, and a host computer WWN column 1223.

FIG. 3 is an explanatory diagram showing an example of the storage volume attribute table 124.

The storage volume attribute table 124 stores attribute information of the storage volume. The attribute information contains a capacity of the storage volume, a bandwidth for designating a data access rate to the storage volume set at the present time, a setting date for designating a date of setting the bandwidth, an updating timing for designating a timing of updating the bandwidth, an updated bandwidth for designating how much the bandwidth is reduced, and a minimum bandwidth for designating a lower limit of the bandwidth.

The storage volume attribute table 124 is constituted of one or more records including a storage volume ID column 1241, a capacity column 1242, a data access rate (bandwidth) column 1243, a setting date column 1244, an updating timing column 1245, an updated bandwidth column 1246, and a minimum bandwidth column 1247. The table may include a record of a storage volume creation date.

Figure 4:
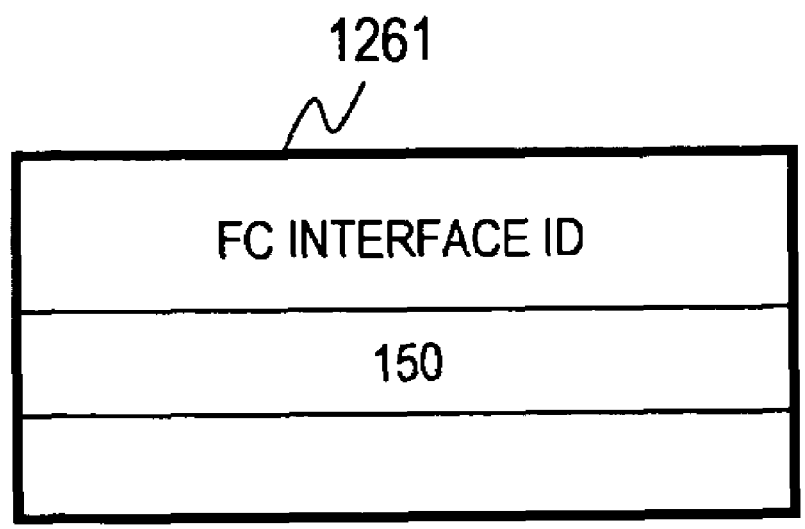
FIG. 4 is an explanatory diagram showing an example of an FC interface management table according to the first embodiment of this invention.

FIG. 4 is an explanatory diagram showing an example of the FC interface management table 126.

The FC interface management table 126 stores pieces of information on all FC interfaces provided in the data storage apparatus of the FC interface management table 126. The FC interface management table 126 is constituted of one or more records including an FC interface ID column 1261.

Figure 5:
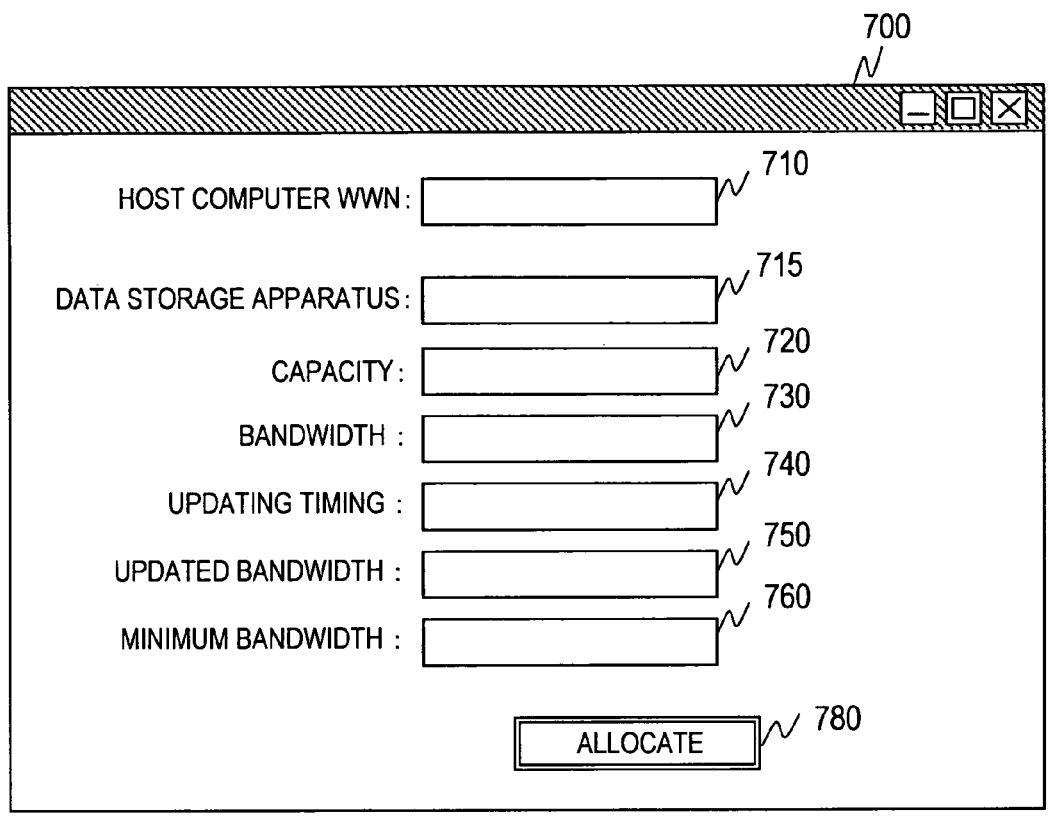
FIG. 5 is an explanatory diagram showing an example of a storage volume allocation screen according to the first embodiment of this invention.

FIG. 5 is an explanatory diagram showing an example of a storage volume allocation screen 700 of the management computer 500.

The management computer 500 displays the storage volume allocation screen 700 on a display 515. The administrator operates the storage volume allocation screen 700 to allocate a storage volume to the host computer 300.

The storage volume allocation screen 700 includes a host computer WWN input field 710 for designating a host computer WWN to which a storage volume is allocated, a data storage apparatus input field 715 for designating a data storage apparatus which creates a storage volume, a capacity input field 720 for designating a capacity to be allocated, a bandwidth input field 730 for designating a bandwidth to be set in the allocated storage volume, an updating timing input field 740 for designating a bandwidth updating timing, an updated bandwidth input field 750 for designating how much the bandwidth is reduced, a minimum bandwidth input field 760 for designating a lower limit of the bandwidth, and a button 780 for designating execution of allocation.

Next, referring to flowcharts of FIGS. 6 to 9, a storage volume allocation process of this embodiment will be described.

Figure 6:
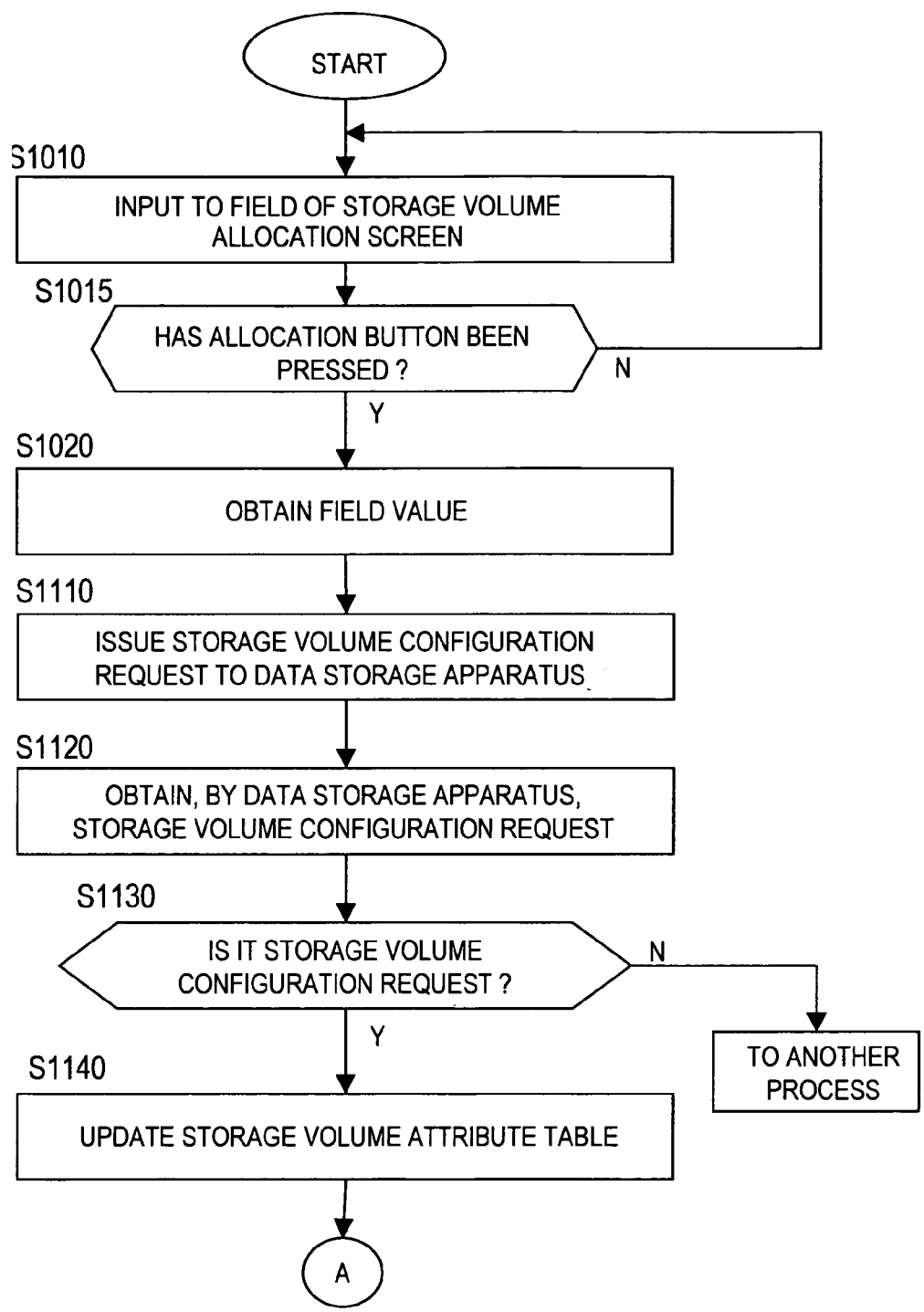
FIG. 6 is a flowchart of a storage volume allocation process according to the first embodiment of this invention.

In FIG. 6, first, the administrator inputs information necessary for the storage volume allocation screen 700 (step S1010).

The request issuance program 521 of the management computer 500 monitors whether the allocation button 780 has been pressed or not (step S1015). Upon pressing of the allocation button 780, the request issuance program 521 obtains a value input to each input field of the storage volume allocation screen 700 (step S1020). Then, the request issuance program 521 creates a storage volume creation request including the obtained value, and issues the request to the data storage apparatus 100 via the management interface 590 (step S1110). The storage volume creation request specifically contains a capacity of the storage volume, a bandwidth, an updating timing, an updated bandwidth, and a minimum bandwidth.

The storage controller 110 of the data storage apparatus 100 receives the storage volume creation request transmitted from the management computer 500. Upon reception of the storage volume creation request transmitted from the management computer 500 (step S1120), the storage controller 110 judges whether the transmitted request is a storage volume creation request (step S1130). If the request is other than the storage volume creation request, a process compliant with the request is carried out (step S1150).

Next, the storage controller 110 transmits the value contained in the storage volume creation request to the storage volume management program 121 to request creation of a storage volume. The storage volume management program 121 creates a storage volume by using the received value. Information of the created storage volume is added to the storage volume attribute table 124 to update the same (step S1140).

To be specific, by using the value obtained in the step S1120, the capacity column, the data access rate (bandwidth) column, the updating timing column, the updated bandwidth column, and the minimum bandwidth column of the storage volume attribute table 124 are updated. A date of updating the storage volume attribute table 124 is input to the setting date column, and a unique ID not overlapped with the others is set in the storage volume ID column. Upon completion of the creation of the storage volume, the storage volume management program 121 transmits a storage volume creation completion notification to the host computer 300 via the management interface 190.

Figure 7:
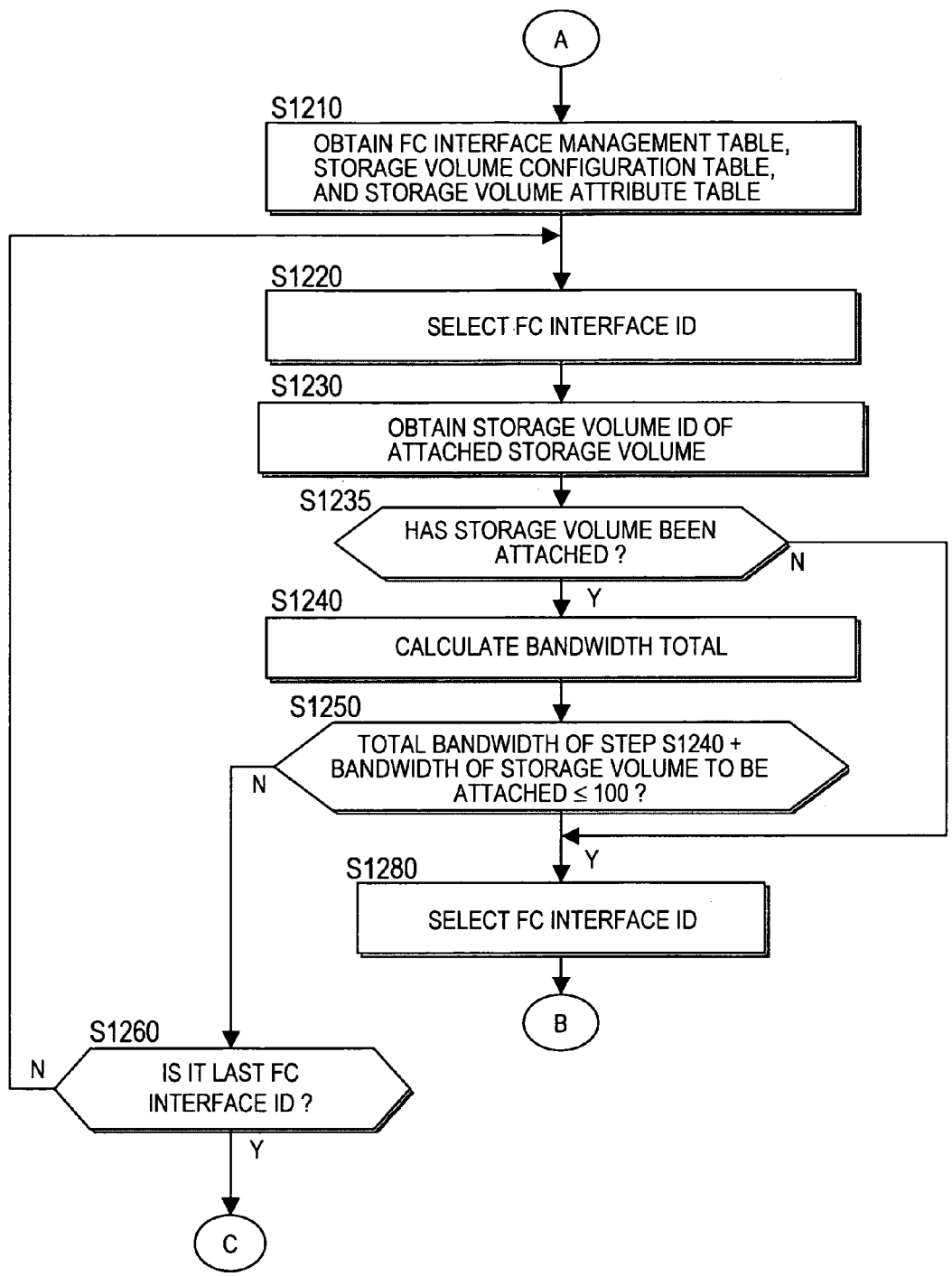
FIG. 7 is a flowchart of the storage volume allocation process according to the first embodiment of this invention.

Referring to FIG. 7, the management computer 500 receives the storage volume creation completion notification from the data storage apparatus 100. The FC interface determining program 523 that has received the storage volume creation completion notification determines an FC interface to which the notified storage volume is attached.

To be specific, the FC interface determining program 523 issues a request of obtaining the FC interface management table 126, the storage volume configuration table 122, and the storage volume attribute table 124 to the data storage apparatus 100 via the management interface 590 (step S1210).

The data storage apparatus 100 transmits information of the FC interface management table 126, the storage volume configuration table 122, and the storage volume attribute table 124 to the management computer 500 via the management interface 190 in response to the request. Subsequently, the FC interface determining program 523 selects one FC interface ID contained in the FC interface management table 126 in order of the records (step S1220). By using the selected FC interface as a key, all storage volume ID's attached to the FC interface selected from the storage volume configuration table 122 are obtained (step S1230).

If no storage volume has been attached, the FC interface determining program 523 determines the selected FC interface as an FC interface to which the storage volume is attached (step S1280).

On the other hand, if one or more storage volumes have been attached to the selected FC interface, the FC interface determining program 523 obtains a value of a data access rate (bandwidth) of the storage volume attribute table 124 by using the storage volume ID obtained in the step S1230 as a key. A total of bandwidths set in all the obtained storage volumes is calculated (step S1240). Then, the FC interface determining program 523 judges whether a result of adding a bandwidth of a storage volume to be created to the total of bandwidths calculated in the step S1240 exceeds 100% (step S1250).

Figure 9:
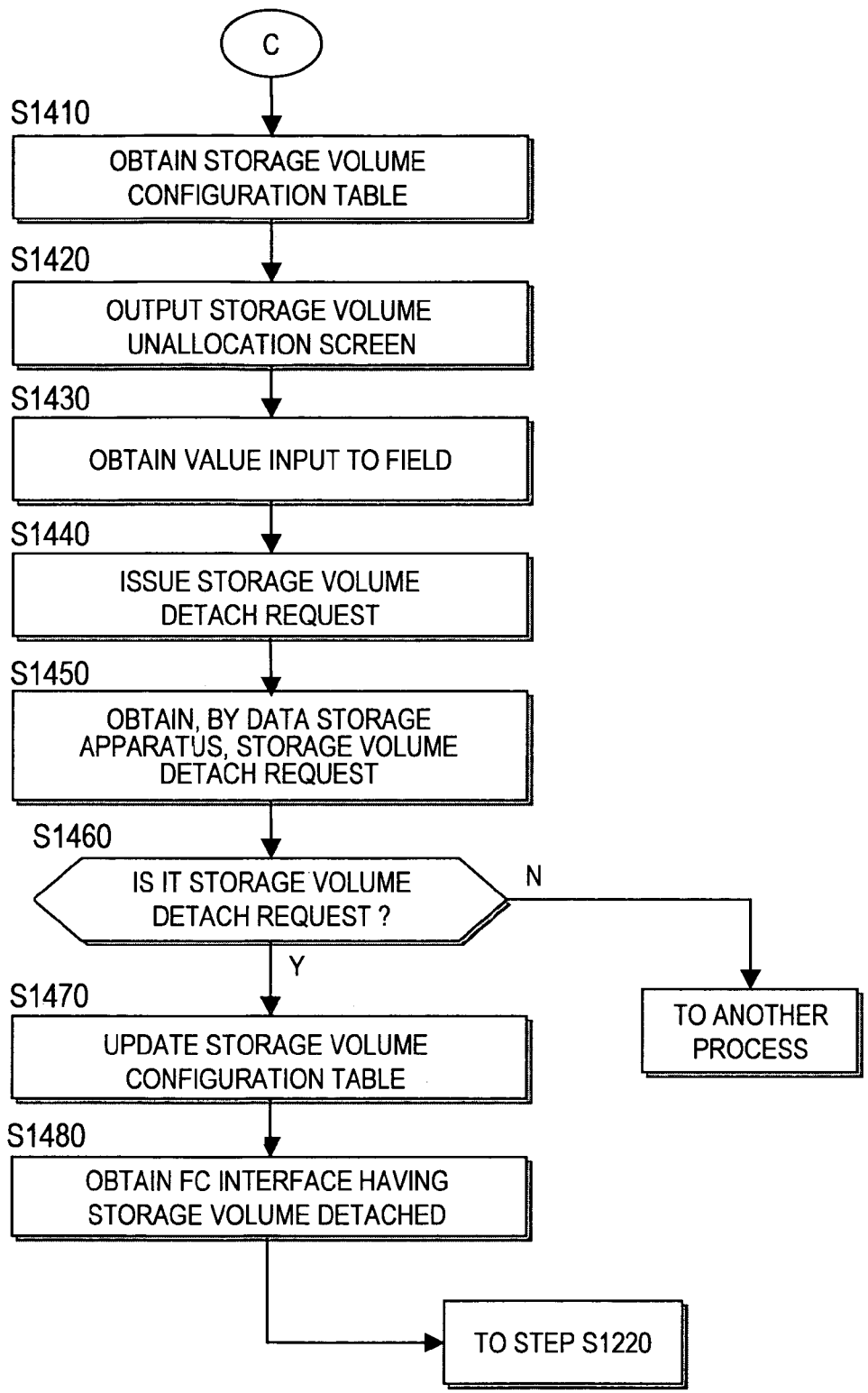
FIG. 9 is a flowchart of the storage volume allocation process according to the first embodiment of this invention.

If it is judged that the result does not exceed 100%, the FC interface determining program 523 determines the selected FC interface as an FC interface to which the storage volume is attached (step S1280). On the other hand, if it is judged that the result exceeds 100%, all the FC interfaces are obtained from the FC interface management table to judge whether more FC interfaces to be selected are present (step S1260). If other FC interfaces are present, the process returns to the step S1220 to select the other FC interfaces, and the process is continued. On the other hand, if the process is executed for all the FC interfaces, and presence of no other FC interfaces is judged, the process of the flowchart of FIG. 9 is carried out.

Upon completion of determining the FC interface, the FC interface determining program 523 informs an FC interface selection completion notification containing the determined FC interface ID to the request issuance program 521.

Figure 8:
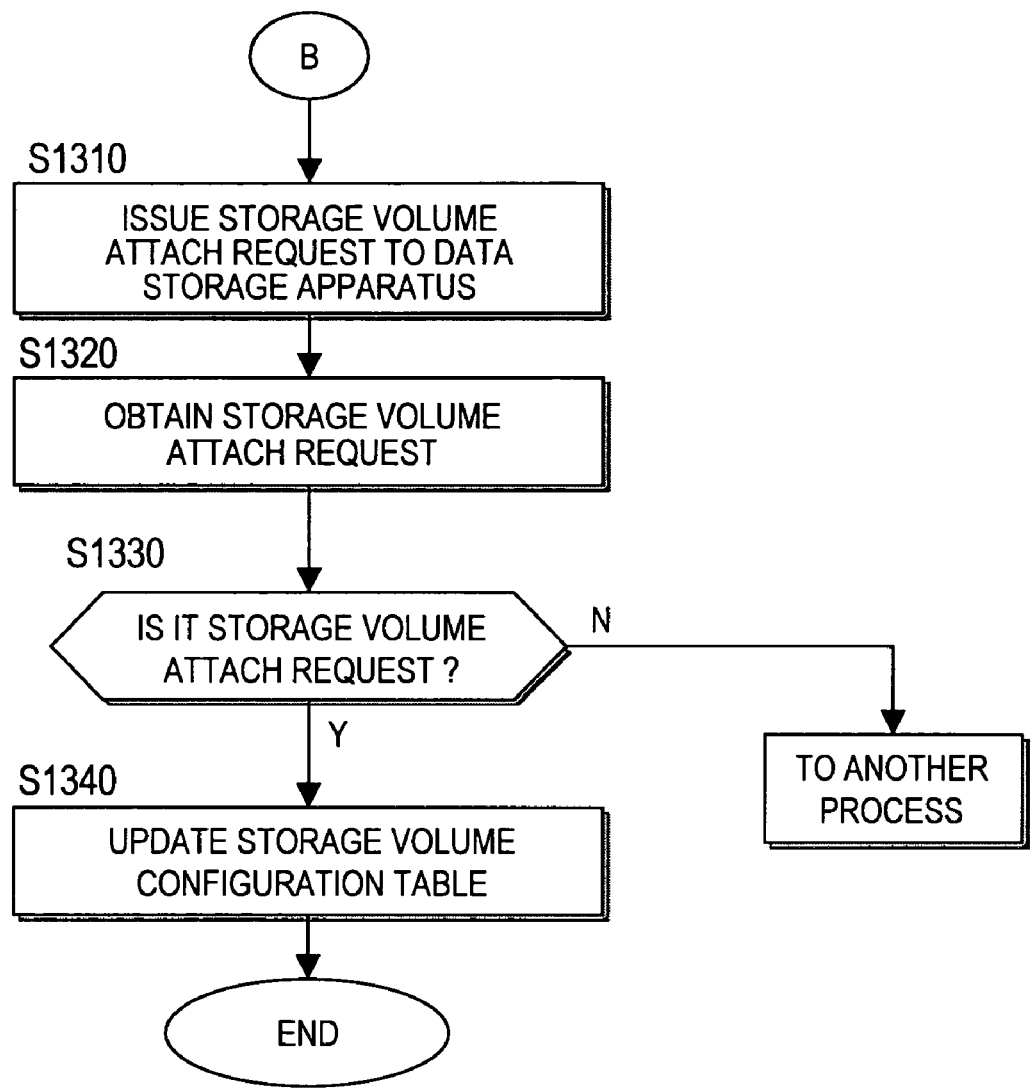
FIG. 8 is a flowchart of the storage volume allocation process according to the first embodiment of this invention.

Referring to FIG. 8, the request issuance program 521 that has received the FC interface selection completion notification creates a storage volume attach request based on the received contents. Then, the created storage volume attach request is issued to the data storage apparatus 100 via the management interface 590 (step S1310). This storage volume attach request contains the host computer WWN obtained from the host computer in the step S1020, the FC interface ID determined by the FC interface determining program 523, and the storage volume ID created by the data storage apparatus 100.

The data storage apparatus 100 receives the storage volume attach request transmitted from the management computer 500. Upon acquisition of the request from the management computer 500 (step S1320), the storage controller 110 judges whether the request is a storage volume attach request (step S1330). If the request is a storage volume attach request, the storage controller 110 transmits the obtained storage volume attach request to the storage volume management program 121 to request to attach storage volume.

By using the value contained in the obtained storage volume attach request, the storage volume management program 121 creates a new record in the storage volume configuration table 122 to update the same (step S1340).

To be specific, the storage volume management program 121 stores the FC interface ID obtained in the step S1330 in the FC interface ID column, the storage volume ID obtained in the step S1330 in the storage volume ID column, and the host computer WWN obtained in the step S1330 in the host computer WWN column in the storage volume configuration table 122. Then, the storage volume management program 121 issues an attach completion notification to the management computer 500 via the management interface 590.

If it is judged in the step S1260 in FIG. 7 that there is no other FC interface, the process of the flowchart of FIG. 9 is executed.

Referring to FIG. 9, the request issuance program 521 requests the data storage apparatus 100 to obtain the storage volume configuration table 122 via the management interface 590 (step S1410). The request issuance program 521 that has obtained the storage volume configuration table 122 outputs a storage volume unallocation screen to the display 515 (step S1420).

The storage volume unallocation screen outputs contents of the storage volume configuration table 122, and inquires of the administrator about which storage volume is unallocated (released). The administrator refers to the storage volume unallocation screen to select the storage volume to be unallocated, and presses the unallocation button.

Upon pressing of the unallocation button, the request issuance program 521 obtains the selected storage volume ID (step S1430). A storage volume detach request containing the obtained storage volume ID is issued to the data storage apparatus 100 (step S1440). The data storage apparatus 100 receives the storage volume detach request transmitted from the management computer 500.

Upon acquisition of the request from the management computer 500 (step S1450), the storage controller 110 judges whether the request is a storage volume detach request (step S1460). If the request is a storage volume detach request, the storage controller 110 transmits the obtained storage volume detach request to the storage volume management program 121 to request to detach storage volume. The storage volume management program 121 deletes the record containing the relevant storage volume ID from the storage volume configuration table 122 to update the same (step S1470). Then, the FC interface ID contained in the deleted record is obtained (step S1480) to return to the step S1220.

In other words, in the management computer 500, the FC interface determining program 523 executes the process of selecting the FC interface of the detached storage volume to attach a storage volume.

Through the above process, the FC interface 150 is attached to the created storage volume 132, and the host computer 301 connected to the FC interface 150 can access the created storage volume 132.

According to this embodiment, the process of creating and allocating the storage volume to the data storage apparatus is executed by the management computer 500. However, the function executed by the management computer 500 may be disposed in the host computer 300, and the host computer 300 may execute the process of creating and allocating a storage volume of the data storage apparatus 100 via the management interface 390. By taking the opportunity that the host computer 300 has issued the storage volume attach request to the management computer 500, the management computer 500 may execute the above process.

Next, a specific example of the process described above with reference to FIGS. 6 to 9 will be described.

The host computers 301 and 302 are in states where no storage volume of the data storage apparatus 100 has been allocated (i.e., initial states), and a process of allocating a storage volume to the host computer 301 will first be described.

In the step S1010 of FIG. 6, the administrator inputs "351" which is a WWN of the host computer 301 to the host computer input field 710, "100" which is an ID of the data storage apparatus 100 to the data storage apparatus input field 715, "100 GB" to the capacity input field 720, "65%" to the bandwidth input field 730, "1 month" to the updating timing input field 740, "−10%" to the updated bandwidth input field 750, and "25%" to the minimum bandwidth input field 760.

The bandwidth, the updating timing, the updated bandwidth, and the minimum bandwidth are pieces of information indicating that an initial bandwidth is set to 65%, the bandwidth is updated to be reduced by 10% per month, and the updating of the bandwidth is stopped (minimum bandwidth is maintained) when the bandwidth becomes 25% at the end.

The data storage apparatus 100 creates a storage volume by using the value received from the management computer 500, and the storage volume attribute table 124 is updated as shown in FIG. 3.

To be specific, a setting date is set to "2006/01/01 00:00", and a storage volume ID is set to "132".

Subsequently, in the data storage apparatus 100, the storage volume configuration table 122 is updated as shown in FIG. 2 by using the FC interface 150 determined by the management computer 500. To be specific, the FC interface 150 and the storage volume ID 132 are allocated to the host computer 301 of the host computer WWN 351.

Next, a new storage volume is allocated to the host computer 302. A capacity of a storage volume to be allocated to the host computer 302 is "50 GB", a bandwidth set in the storage volume is "30%", an updating timing is "1 month", an updated bandwidth is "−10%", and a minimum bandwidth is "20%".

First, through the process of the flowcharts of FIGS. 6 and 7, a record in which a storage volume ID is "134" and a date of creating a storage volume is "2006/02/01 00:00" is created in the storage volume attribute table 124. As a result of allocating this second storage volume, as shown in FIG. 10, the record of the storage volume having the storage volume ID 134 is added to the storage volume attribute table 124.

Subsequently, through the process of FIG. 8, as a result of allocating the host computer 302 to the storage volume, the storage volume configuration table is updated as shown in FIG. 11. To be specific, the FC interface ID 150 and the storage volume ID 134 are allocated to the host computer 302 of the host computer WWN 352.

Next, a storage volume is allocated to the host computer 301. A capacity of the storage volume to be allocated to the host computer 301 is "100 GB", a bandwidth set in the storage volume is "40%", an updating timing is "2 months", an updated bandwidth is "−5%", and a minimum bandwidth is "20%". A storage volume ID is "135", and a date of creating the storage volume is "2006/03/01 00:00".

The storage volume configuration table 122 is as shown in FIG. 11, and the storage volume attribute table 124 is as shown in FIG. 12 immediately before the allocation of this third storage volume.

As in the of the first storage volume allocation, the process of the flowcharts of FIGS. 6 to 9 is carried out. In the step S1140 of FIG. 6, the storage volume attribute table 124 is updated as shown in FIG. 13. The process proceeds and, in the step S1250 of FIG. 7, a total of 65%, which is a total bandwidth of the allocated storage volumes 132 and 134, and 40%, which is a bandwidth 135 to be allocated, exceeds 100%. Thus, the process proceeds to the step S1260 and, as an ID is a last FC interface ID, the process of FIG. 9 is executed.

In FIG. 9, the management computer 500 obtains the storage volume configuration table 122 from the data storage apparatus 100 (step S1410), and outputs a storage volume unallocation screen (step S1420). The administrator selects a storage volume to be unallocated from the storage volume unallocation screen.

The administrator selects the storage volume of a storage volume ID "134" to be unallocated. The management computer 500 obtains the selected storage volume ID "134" (step S1430), and issues a storage volume detach request containing this storage volume ID to the data storage apparatus 100 (step S1440). Upon acquisition of the storage volume detach request from the management computer 500, the data storage apparatus 100 uses the storage volume management program 121 to update the storage volume configuration table 122 to contents shown in FIG. 14. In other words, a record in which the storage volume ID is "134" is deleted. Then, the FC interface ID contained in the deleted record is obtained (step S1480), and the process returns to the step S1220. The management computer 500 attaches a new storage volume to the FC interface of the detached storage volume.

Upon an end of all the processes, the storage volume configuration table 122 is updated to contents shown in FIG. 15.

Thus, if there is no FC interface to which a storage volume can be attached, the management computer 500 detaches the attached storage volume to attach a new storage volume. The management computer 500 may finish the process without detaching the attached storage volume but by notifying an error to the administrator.

With a passage of one month after attach of a third storage volume 135 to the FC interface 150, the storage volume attribute table 124 is updated by the bandwidth modification program 123 as shown in FIG. 16. As a result, as the total bandwidth of the storage volumes 132 and 135 attached to the FC interface 150 is reduced to 75%, the storage volume 134 of a bandwidth 20% can be attached again to the FC interface.

When the administrator operates the management computer 500 to attach the storage volume 134 to the FC interface 150, the storage volume configuration table 122 is updated as shown in FIG. 17. Accordingly, by reducing the bandwidth of the volume lowered in importance with a passage of time, the storage volume can be effectively used for the entire computer system.

Next, modification of the data access rate (bandwidth) stored in the storage volume attribute table 124 will be described. The data access rate is periodically updated by the bandwidth modification program 123.

Figure 18:
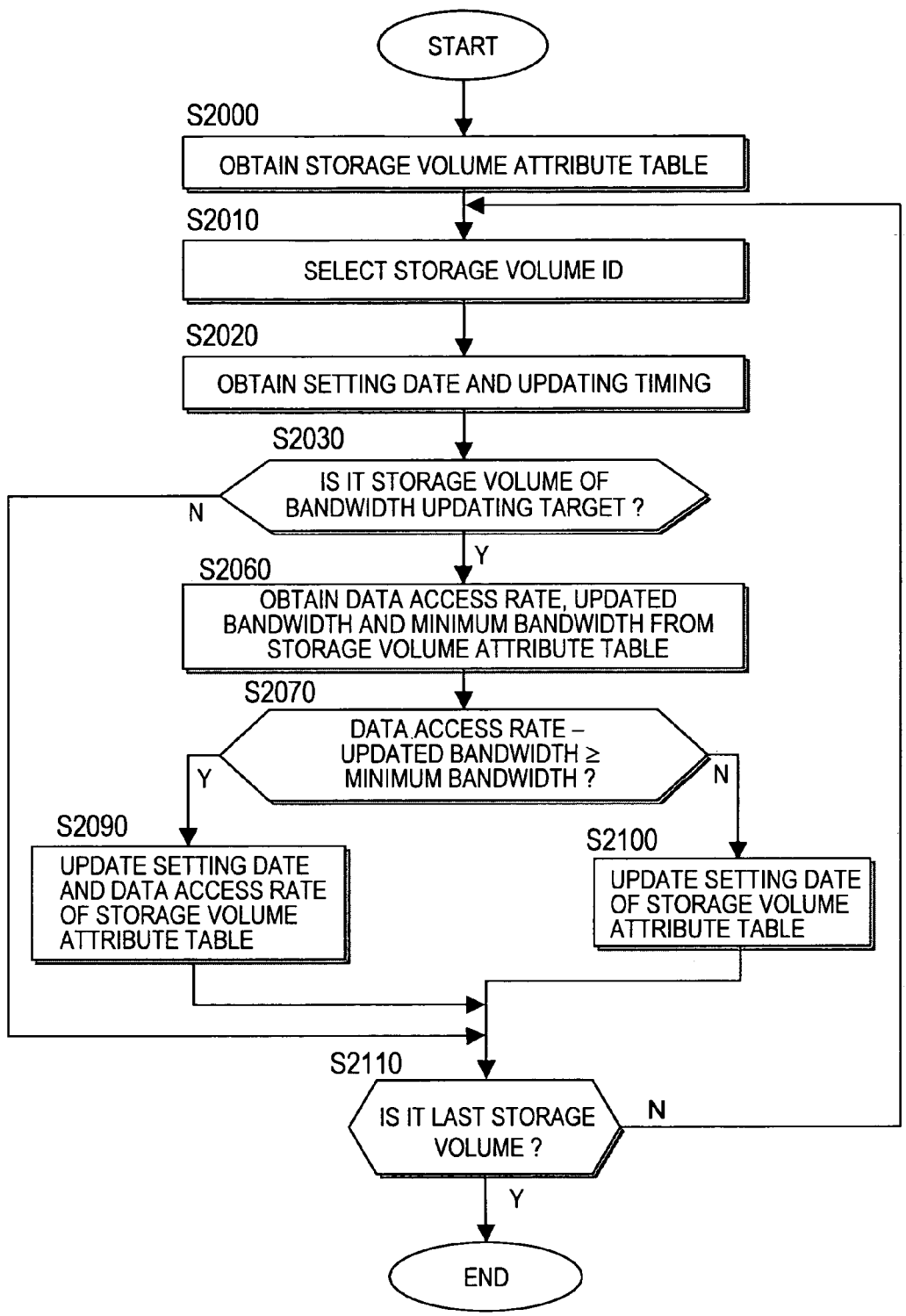
FIG. 18 is a flowchart of a bandwidth modification process of a data access rate according to the first embodiment of this invention.

FIG. 18 is a flowchart of a process of modifying a bandwidth of a data access rate.

In the data storage apparatus 100, the bandwidth modification program 123 is periodically executed. For example, it is executed once a month or a day. Alternatively, the administrator may give an instruction from the management computer 500 to actively execute the program.

When the bandwidth modification program 123 is executed, the storage volume attribute table 124 is first obtained (step S2000). Then, next steps S2010 to S2110 are repeatedly executed for records contained in the obtained storage volume attribute table 124.

The bandwidth modification program 123 selects a storage volume ID from the records of the obtained storage volume attribute table 124 (step S2010). A setting date and an updating timing contained in the record of the selected storage volume ID are obtained (step S2020). Based on the setting date and the updating timing which have been obtained, judgment is made as to whether a bandwidth of the selected storage volume is an updating target (step S2030). To be specific, judgment is made as to whether a present date exceeds a date obtained by adding the updating timing to the setting date. If the selected storage volume is not an updating target, a next storage volume is selected to process the record.

If it is judged that the selected storage volume is an updating target, the bandwidth modification program 123 obtains a data access rate (bandwidth), an updated bandwidth, and a minimum bandwidth of the selected storage volume from the storage volume attribute table 124 (step S2060). Then, judgment is made as to whether a result of subtracting the updated bandwidth from the data access rate (bandwidth) is equal to or more than the minimum bandwidth (step S2070). If it is judged that the subtracting result is equal to or more than the minimum bandwidth, the bandwidth modification program 123 updates the setting date and the data access rate (bandwidth) (step S2090).

To be specific, the setting date column stores a present date, and the data access rate (bandwidth) column stores the result of subtraction of the step S2070. On the other hand, if the subtraction result is less than the minimum bandwidth, the bandwidth modification program 123 updates the setting date column alone to the present date (step S2100).

Upon completion of the bandwidth updating of one storage volume through the above process, the process returns to the step S2010 to select a next storage volume, and the process of the steps S2010 to S2100 is repeated (step S2110).

Through the process of FIG. 18, the bandwidth set in the storage volume is updated.

This process will be described in detail. When a storage volume of a storage volume ID 132 is in a state shown in FIG. 3, the bandwidth modification program 123 is executed at a present date 2006/02/01 00:00. The bandwidth modification program 123 detects that the present date is a date obtained by adding an updating timing to a setting date regarding the storage volume of the storage volume ID "132" obtained from the storage volume attribute table 124, and judges that this storage volume is an updating target of a data access rate. The bandwidth modification program 123 calculates a data access rate (bandwidth) of the storage volume 132 as 65%−10%=55%. The updating result of this bandwidth of the storage volume of the storage volume ID 132 is updated as shown in FIG. 10.

Thus, irrespective of attach of the storage volume to the FC interface, the bandwidth is reduced by an amount designated by the selected timing after the creation of the storage volume.

Next, bandwidth management of access from the host computer 300 to the data storage apparatus 100 will be described.

The bandwidth management is carried out by the data transmission management module 115 of the data storage apparatus 100 while referring to the storage volume configuration table 122 and the storage volume attribute table 124.

An example in which the storage volume configuration table 122 is set as shown in FIG. 17 and the storage volume attribute table 124 is set as shown in FIG. 16 will be described. In other words, the host computer 301 accesses the storage volumes 132 and 136, and the host computer 302 accesses the storage volume 134. The access from each of the host computers 301 and 302 is received by the data storage apparatus 100 via the FC interface 150.

The host computers 301 and 302 respectively issue requests of reading/writing in the storage volumes 132 and 134 to the data storage apparatus 100. The reading/writing request contains at least a WWN of the host computer that has issued the request, a storage volume ID, and an FC interface ID of the data storage apparatus 100 to which the storage volume has been attached. Upon reception of the request from the host computer, the storage controller 110 judges a content of the request to be a reading/writing request.

The storage controller 110 transmits the storage volume ID contained in the reading/writing request to the data transmission management module 115 to request a reading/writing request. The data transmission management module 115 obtains a data access rate (bandwidth) of each storage volume from the storage volume attribute table 124 by using the obtained storage volume ID as a key. Then, the reading/writing process is controlled according to each obtained rate. In this case, a rate of the reading/writing process in the storage volume 132 is controlled to be 35% according to the data access rate of FIG. 16, and a rate of the reading/writing process in the storage volume 134 is controlled to be 20%.

Thus, by enabling setting of a bandwidth for each storage volume, even when time has passed after the creation and access concentrates in the storage volume of the reduced bandwidth, it is possible to guarantee the set bandwidth without reducing performance of access to the storage volume which has stored latest data. Moreover, because the bandwidth of the storage volume attached to the FC interface is reduced with time, if a margin is generated in the total bandwidth, a new storage volume can be further attached to the FC interface.

Second Embodiment

Next, a computer system of a second embodiment of this invention will be described. According to the second embodiment, storage volumes to be accessed by a host computer can be allocated to a plurality of data storage apparatuses. Components similar to those of the first embodiment are denoted by similar reference numerals, and description thereof will be omitted.

Figure 19:
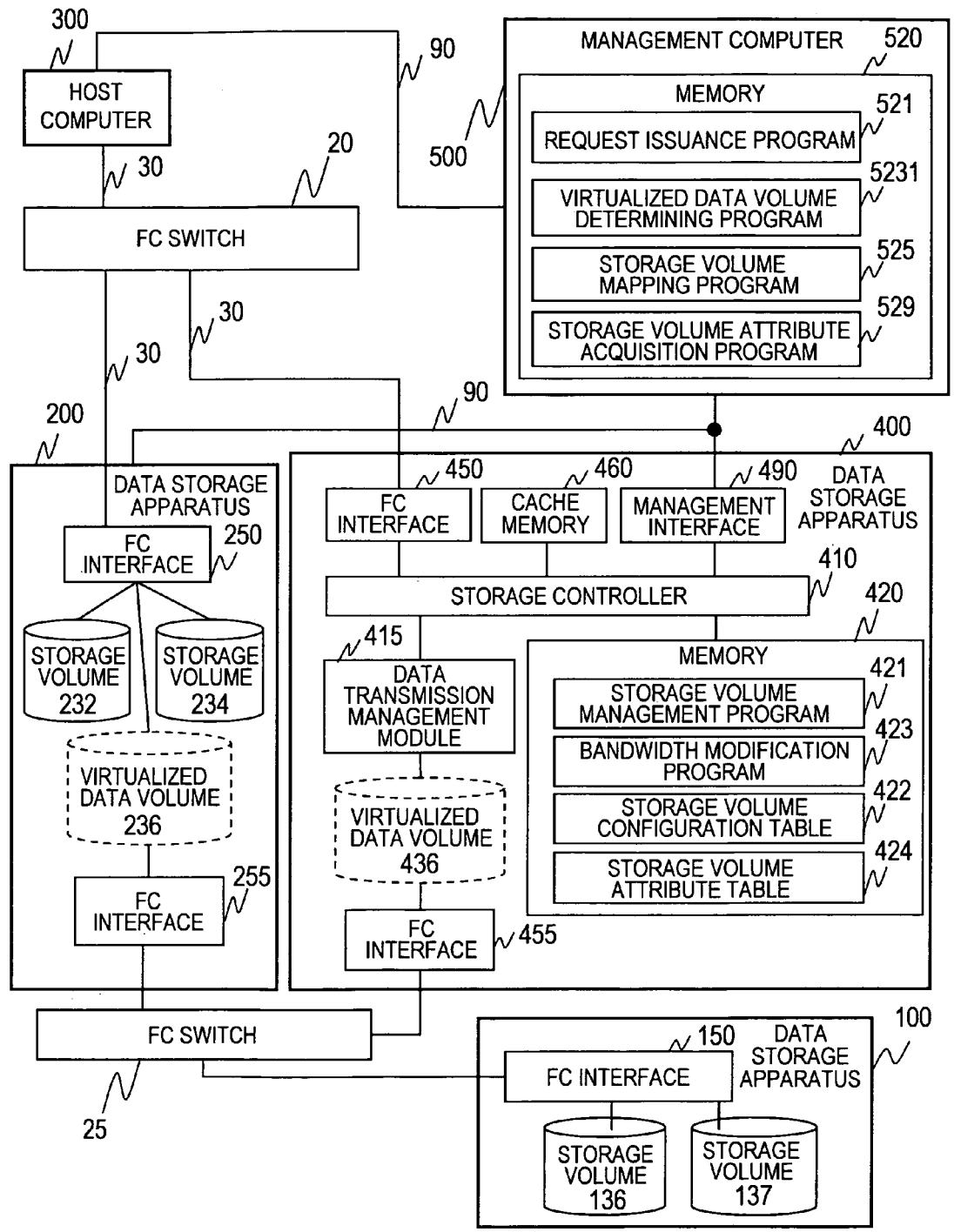
FIG. 19 is a block diagram showing a configuration of a computer system according to a second embodiment of this invention.

FIG. 19 is a block diagram showing a configuration of the computer system according to the second embodiment.

A host computer 300 and data storage apparatuses 200 and 400 are interconnected via a network. The data storage apparatuses 200 and 400 are connected to the data storage apparatus 100 via the network.

Accordingly, a configuration is employed in which the data storage apparatuses 200 and 100 or the data storage apparatuses 400 and 100 are tiered. Storage volumes included in the data storage apparatuses 200 and 400 can be provided to the host computer, or a storage volume of the data storage apparatus 100 can be provided to the host computer as if it were a storage volume of the data storage apparatuses 200 or 400.

The data storage apparatuses 200 and 400 are basically similar in configuration to the data storage apparatus 100. However, the data storage apparatuses 200 and 400 respectively include FC interfaces 255 and 455 for connection with the other data storage apparatus. The data storage apparatus 200 includes storage volumes 232 and 234 and a virtualized data volume 236, and the data storage apparatus 400 includes a virtualized data volume 436. The virtualized data volumes 236 and 436 are connected to the FC interfaces 255 and 455.

The virtualized data volume is a virtual storage volume mapped with a storage volume of a 2nd tier data storage apparatus not to store real data. Each of the data storage apparatuses 200 and 400 provides the storage volume of the data storage apparatus 100 to the host computer as if it were its own storage volume. In other words, the data storage apparatus 200 or 400 that has received a reading/writing request in the virtualized data volume from the host computer transfers the reading/writing request to a storage volume of the mapped 2nd tier data storage apparatus, and notifies process completion to the host computer upon its reception from the 2nd tier data storage apparatus.

FIG. 19 shows the configuration of the data storage apparatus 400 alone in detail. The data storage apparatuses 200 and 100 are similar in configuration to the data storage apparatus 400 except for the facts that components 400s of the data storage apparatus 400 are all changed to 200s in the configuration of the data storage apparatus 200 and components 400s of the data storage apparatus 400 are changed to 100s in the configuration of the data storage apparatus.

A management computer 500 further includes a virtualized data volume determining program 5231 for determining a virtualized data volume with which the 2nd tier storage volume is mapped, a storage volume mapping program 525 for mapping storage volumes of 1st and 2nd tier data storage apparatus with each other, and a storage volume attribute acquisition program 529 for obtaining attribute information of a storage volume from the data storage apparatus.

The data storage apparatuses 200 and 400 respectively include storage volume configurations tables 222 and 422. FIG. 20 is an explanatory diagram showing an example of the storage volume configuration table 222 of the data storage apparatus 200. FIG. 21 is an explanatory diagram showing an example of the storage volume configuration table 422 of the data storage apparatus 400.

As compared with the storage volume configuration table 122 of the first embodiment, the storage volume configuration table 422 further includes an external interface ID column 2221, an external data storage apparatus ID column 2222, and an external storage volume ID column 2223. The external data storage apparatus ID and the external storage volume ID respectively store a data storage ID of the 2nd tier data storage apparatus and a storage volume ID mapped with the virtualized data volume. The external interface ID stores an FC interface ID connected to the 2nd tier data storage apparatus.

The virtualized data volumes 236 and 436 shown in FIGS. 20 and 21 are attached to the FC interfaces. However, as they are yet to be mapped with the 2nd tier storage volume, the external data storage apparatus ID column 2222, the external data storage volume ID column 2223, and the host computer WWN column 1223 are blank.

FIG. 22 is an explanatory diagram showing an example of the storage volume configuration table 122 of the data storage apparatus 100. As the data storage apparatus 100 has no 2nd tier data storage apparatus, a structure almost similar to that of the storage volume configuration table of the first embodiment is employed. To be specific, in the data storage apparatus 100, storage volumes 136 and 137 are attached to an FC interface 150. However, as these storage volumes are yet to be mapped with the 1st tier storage volume, the host computer WWN column 1223 for storing a WWN of the FC interface of the 1st tier apparatus permitted to access the storage volumes is blank.

The storage volume configuration table 122 of the storage volume 100 may be similar in structure to the storage volume configuration table of the apparatus having the 2nd tier data storage apparatus shown in FIG. 20 or 21.

The data storage apparatuses 200 and 400 include storage volume attribute tables as in the case of the data storage apparatus 100.

FIG. 23 is an explanatory diagram showing an example of the storage volume attribute table 224 of the data storage apparatus 200. FIG. 24 is an explanatory diagram showing an example of the storage volume attribute table 424 of the data storage apparatus 400.

As compared with the storage volume attribute table 124 of the first embodiment described above, a real/virtual flag column 2241 is further included. A real/virtual flag indicates that a storage volume set to "real" is a storage volume for actually storing data. A storage volume set to "virtual" is a virtual storage volume in which no real data is stored: When a 2nd tier storage volume is mapped with the virtual storage volume, contents (capacity, bandwidth, setting date, updating timing, bandwidth, and minimum bandwidth) of the record store information similar to attributes of the 2nd tier storage volume.

FIG. 25 is an explanatory diagram showing an example of the storage volume attribute table 124 of the data storage apparatus 100. As the data storage apparatus 100 includes no 2nd tier data storage apparatus, a structure almost similar to that of the storage volume configuration table of the first embodiment is employed. The storage volume attribute table 124 may be similar in structure to the storage volume attribute table of the apparatus having the 2nd tier data storage apparatus shown in FIG. 23 or 24.

Next, a process of mapping the storage volume 136 of the 2nd tier data storage apparatus 100 with the 1st tier data storage apparatus 200 or the virtualized data volume of the data storage apparatus 400 will be described.

Figure 26:
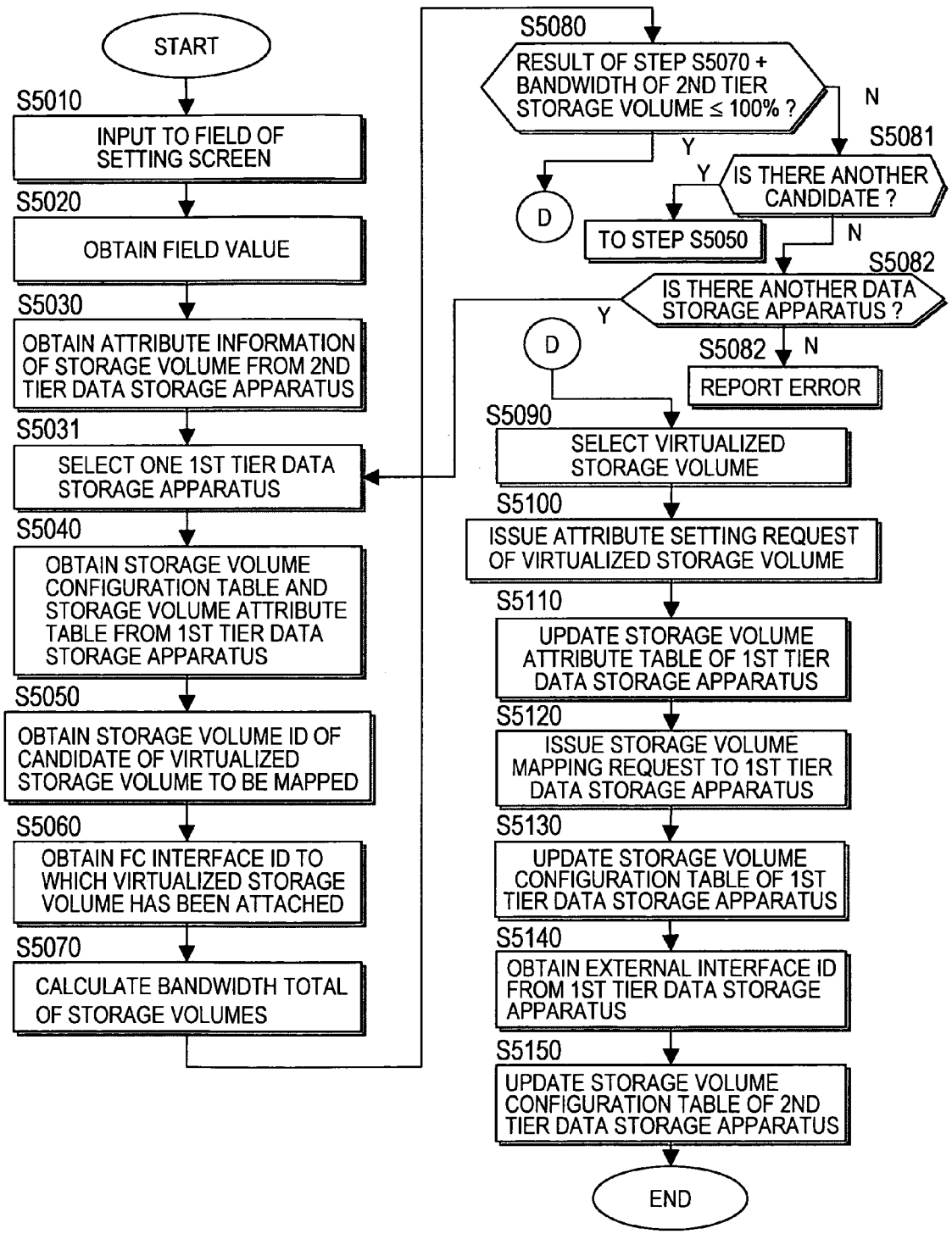
FIG. 26 is a flowchart of a virtualized data volume mapping process according to the second embodiment of this invention.

FIG. 26 is a flowchart of the virtualized data volume mapping process. In this case, a process of mapping the storage volume 136 of the data storage apparatus 100 to the virtualized data volume will be described.

First, an administrator operates the management computer 500 to input a request of mapping the storage volume 136 with the virtualized data volume. The administrator inputs a WWN of a host computer to which the virtualized data volume is allocated and a 2nd tier storage volume ID mapped with the virtualized data volume to input fields of a setting screen (step S5010).

In the management computer 500, a storage volume attribute acquisition program 529 obtains the host computer WWN and the 2nd tier storage volume ID which have been input (step S5020). The storage volume attribute acquisition program 529 requests the data storage apparatus 100 to obtain attribute information of a storage volume matched with the obtained storage volume ID. Upon reception of this request, the data storage apparatus 100 transmits the attribute information of the storage volume (step S5030). Upon reception of the attribute information from the data storage apparatus 100, the virtualized data volume determining program 5231 executes a process of selecting a virtualized data volume with which the storage volume 136 is mapped.

The virtualized data volume determining program 5231 executes selection of virtualized data volumes in order of ID's of the data storage apparatus, and finishes the process when the data storage apparatus are determined. First, the virtualized data volume determining program 5231 obtains a storage volume configuration table and a storage volume attribute table from the 1st tier data storage apparatus (step S5040). The virtualized data volume determining program 5231 obtains a storage volume ID of a virtualized data volume in which a real/virtual flag of the storage volume attribute table is "virtual" and to which no 2nd tier storage volume is mapped (step S5050). In this case, in a case where a plurality of virtualized data volumes are relevant, that of a smallest storage volume ID is selected.

Next, the virtualized data volume determining program 5231 determines an FC interface to which the selected storage volume of the storage volume ID has been attached from the storage volume configuration table (step S5060). A total of bandwidths of storage volumes attached to the selected FC interface is calculated (step S5070). Then, judgment is made as to whether a value obtained by adding a bandwidth set in the storage volume 136 to the calculated bandwidth total exceeds 100% (step S5080). If the value does not exceed 100%, the virtualized data volume determining program 5231 determines the virtualized data volume selected in the step S5050 as a virtualized data volume to be mapped with the storage volume 136 (step S5090). On the other hand, if the value exceeds 100%, presence of a candidate of another storage volume is confirmed to return to the step S5050, and the other storage volume is selected to continue the process (step S5081). If there is no virtualized data volume relevant to the data storage apparatus of a processing target, presence of another data storage apparatus is confirmed to return to the step S503 1, and a next data storage apparatus is selected to continue the process (step S5082). If there is no other data storage apparatus, an error is reported (step S5083).

In the example of FIG. 20, storage volumes 232 and 234 have been attached to the FC interface 250 to which the virtualized data volume 236 of the data storage apparatus 200 has been attached. Thus, a total of bandwidths is obtained as 65%+30%=95%. Because the total exceeds 100% if a new storage volume is attached, it is ruled out from setting candidates. In the example of FIG. 21, no real storage volume has been attached to an FC interface 450 of a data storage apparatus 400. Thus, a virtualized data volume 436 is determined as a virtualized data volume to be mapped with a storage volume.

Upon completion of the selection of the virtualized data volume to be mapped with the storage volume 136, a storage volume mapping program 525 issues an attribute setting request of the virtualized data volume to the data storage apparatus 400 (step S5100). This attribute setting request contains attribute information of the storage volume 136 obtained in the step S5030 and virtualized data volume ID selected in the step S5090. In the data storage apparatus 400, a storage volume management program 421 which has obtained the attribute setting request updates a record of the virtualized data volume 436 of the storage volume attribute, table 424 based on the received attribute setting request (step S5110).

To be specific, as shown in FIG. 27, values equal to the attribute information of the storage volume 136 are stored in a capacity column, a bandwidth column, a setting date column, an updating column, an updated bandwidth column, and a minimum bandwidth column of the storage volume attribute table 424.

Upon completion of the updating of the storage volume attribute table 424, the storage volume management program 421 reports an attribute modification completion report to the management computer 500. In the management computer 500, the storage volume mapping program 525 which has obtained the attribute modification notification of the virtualized data volume from the data storage apparatus 400 issues a storage volume mapping request to the data storage apparatus 400 (step S5120). This storage volume mapping request contains the virtualized data volume ID determined in the step S5090, a storage volume ID of a 2nd tier storage volume 136, a data storage apparatus ID which has the storage volume 136, and the host computer WWN obtained in the step S5020. In the data storage apparatus 400, the storage volume management program 421 which has obtained the storage volume mapping request from the management computer 500 refers to the storage volume configuration table 422 to update a record of a storage volume ID 436 according to contents of the obtained storage volume mapping request (step S5130).

To be specific, as shown in the storage volume configuration table 422 of FIG. 28, the host computer WWN contained in the storage volume mapping request is stored in the host computer WWN column. The data storage apparatus ID contained in the storage volume mapping request is stored in an external data storage apparatus column. The storage volume ID contained in the storage volume mapping request is stored in an external storage volume ID column.

The storage volume management table 421 that has finished updating of the storage volume configuration table 422 reports a mapping completion notification to the management computer 500.

In the management computer 500, the storage volume mapping program 525 which has obtained the mapping completion notification from the data storage apparatus 400 requests the data storage apparatus 400 to obtain the storage volume configuration table 422, and obtains an external interface ID connected to the virtualized data volume mapped in the step S5130 (step S5140).

Upon acquisition of the external interface ID, the storage volume mapping program 525 transmits the external interface ID to the 2nd tier data storage apparatus 100 to issue a host computer WWN setting request to enable accessing the storage volume 136. In the data storage apparatus 100, the storage volume management program 121 which has obtained the host computer WWN setting request from the host computer 500 updates the storage volume configuration table 122 according to contents of the host computer WWN setting request (step S5150). To be specific, as shown in FIG. 29, the external interface ID contained in the host computer WWN setting request of the step S5150 is stored in the host computer WWN column of the storage volume 136 of the storage volume configuration table 122.

Upon completion of the process thus far, the storage volume mapping program 525 notifies an FC interface ID "450" of the 1st tier data storage apparatus and a storage volume ID "436" of the virtualized data volume to the host computer 300. Upon reception of the FC interface ID and the storage volume ID from the management computer 500, the host computer 300 stores these ID's. Then, the host computer 300 issues a reading/writing request to the virtualized data volume 436 by using the FC interface ID and the storage volume ID. As a result, the storage volume 136 mapped with the virtualized data volume can be accessed.

As described above, the management computer 500 maps the 2nd tier storage volume with the 1st tier storage volume, and sets attributes of the virtualized data volume according to attributes of the 2nd tier storage volume.

The bandwidth modification programs 123, 223, and 423 of the data storage apparatus periodically monitor the storage volume attribute tables 124, 224, and 424 and updates the bandwidths based on the updated bandwidth and the updating timing set for each storage volume as in the case of the first embodiment. This process is similar to that of the first embodiment shown in FIG. 18, and thus description thereof will be omitted. For the 2nd tier storage volume mapped with the virtualized data volume, the bandwidth is updated simultaneously when a bandwidth updating process of the virtualized data volume is carried out. For a virtualized data volume with which the 2nd tier storage volume is not mapped, a bandwidth updating process is not executed because a setting date, an updating timing, or the like is not set.

Next, a process of modifying the 2nd tier storage volume mapped with the virtualized data volume to another 2nd tier storage volume will be described.

Figure 30:
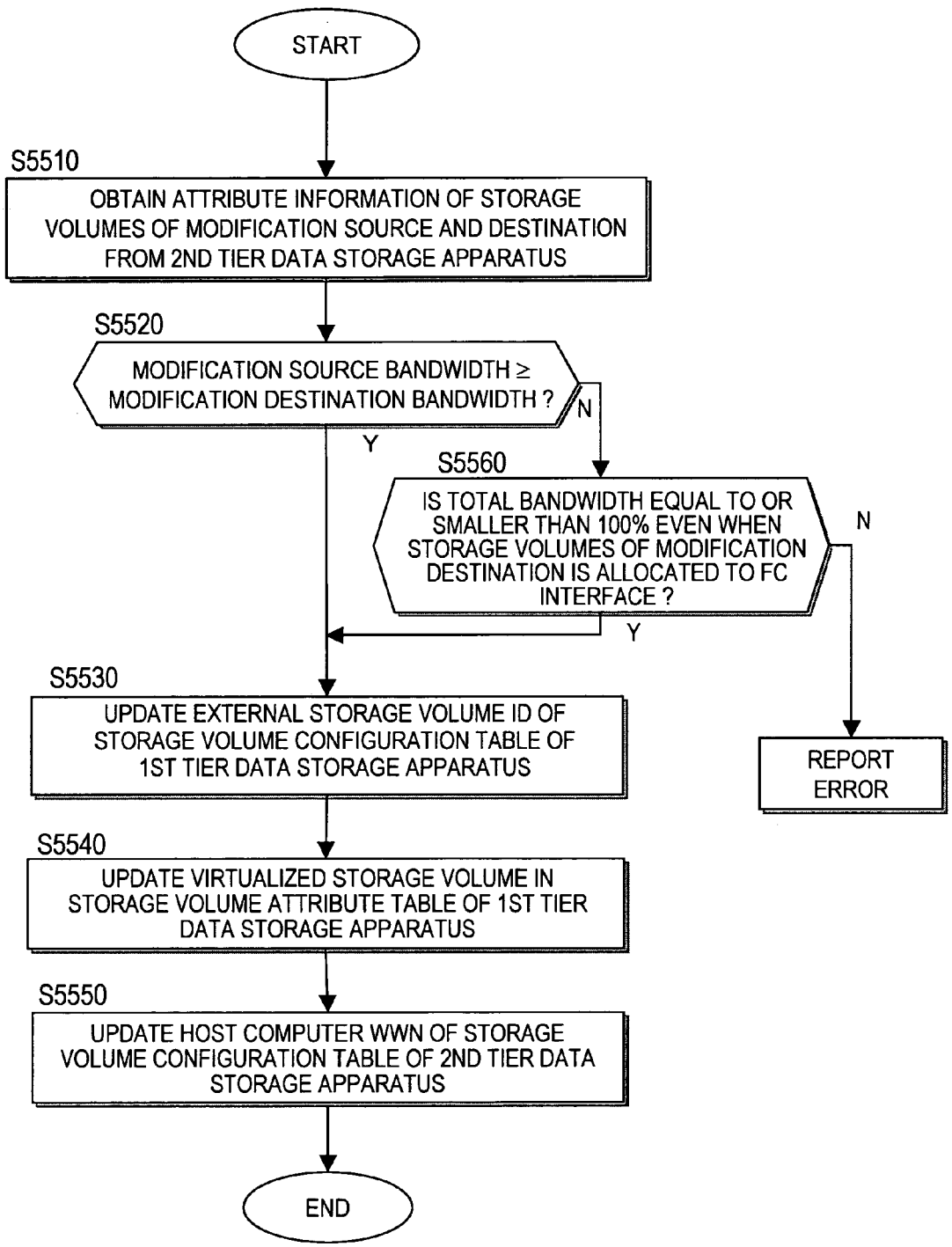
FIG. 30 is a flowchart of a virtualized data volume modification process according to the second embodiment of this invention.

FIG. 30 is a flowchart of a virtualized data volume modification process.

A process of modifying the 2nd storage volume 136 mapped with the virtualized data volume 436 of the data storage apparatus 400 to a storage volume 137 will be described.

The process of the flowchart is started by taking an opportunity that the host computer 300 issues a switching request of the 2nd storage volume with the virtualized data volume to the management computer 500.

First, the storage volume mapping program 525 of the management computer 500 makes an inquiry to the data storage apparatus 100 to obtain attribute information of the storage volume 137 of a modification destination and the storage volume 136 of a modification source from the storage volume attribute table 124 (step S5510). The storage volume mapping program 525 judges whether a bandwidth set in the storage volume 136 of the modification source is equal to or more than that of the storage volume 137 of the modification destination (step S5520).

If the bandwidth of the storage volume of the modification source is equal to or more than that of the storage volume of the modification destination, a bandwidth of the entire FC interface is not affected even when the storage volume is modified to the storage volume of the modification destination. Thus, the storage volume mapping program 545 issues a storage volume modification request to the data storage apparatus 400. In the data storage apparatus 400, the storage volume management program 421 refers to the storage volume configuration table 422 to update the external storage volume ID mapped with the virtualized data volume of the storage volume ID 436 from "136" to "137" (step S5530).

The storage volume management program 421 refers to the storage volume attribute table 424 to update attributes of the virtualized data volume 436 to those of the storage volume 137 (step S5540). To be specific, based on the attribute information of the 2nd storage volume 137 obtained in the step S5510, the capacity column, the bandwidth column, the setting date column, the updating timing column, the updated bandwidth column, and the minimum bandwidth column of the storage volume attribute table 424 are updated.

Then, the storage volume mapping program 545 transmits a storage volume modification request to the data storage apparatus 100. In the data storage apparatus 100, the storage volume management program 121 refers to the storage volume configuration table 124 to set "455" of the host computer WWN of the storage volume 136 of the modification source in the host computer WWN column of the storage volume 137 of the modification destination (step S5550).

On the other hand, if the bandwidth of the storage volume of the modification destination is equal to or more than that of the storage volume of the modification source in the step S5520, the storage volume mapping program 545 requests the data storage apparatus 400 to obtain the storage volume configuration table 422. Then, by referring to the obtained storage volume attribute table 424, judgment is made as to whether the total bandwidth of the FC interface 450 exceeds 100% even when the storage volume 137 of the modification destination is mapped with the virtualized data volume 436 (step S5560). If the total bandwidth does not exceed 100%, the process proceeds to step S5530. If the total bandwidth exceeds 100%, the storage volume mapping program 545 notifies an error to the administrator to stop the process. The storage volume mapping program 545 may inquire of the administrator about another mapped virtualized data volume.

Through the above process, by modifying the 2nd storage volume to be mapped with the virtualized data volume, an actual volume and an actual bandwidth of the storage volume can be set to vary by the mapped 2nd storage volume while an access destination from the host computer 300 is the same virtualized data volume 436.

Third Embodiment

Next, a computer system of a third embodiment of this invention will be described. According to the third embodiment, a bandwidth of a storage volume is modified by moving data stored in a real storage volume to a storage volume mapped with a virtualized data volume. Components similar to those of the first or second embodiment are denoted by similar reference numerals, and description thereof will be omitted.

Figure 31:
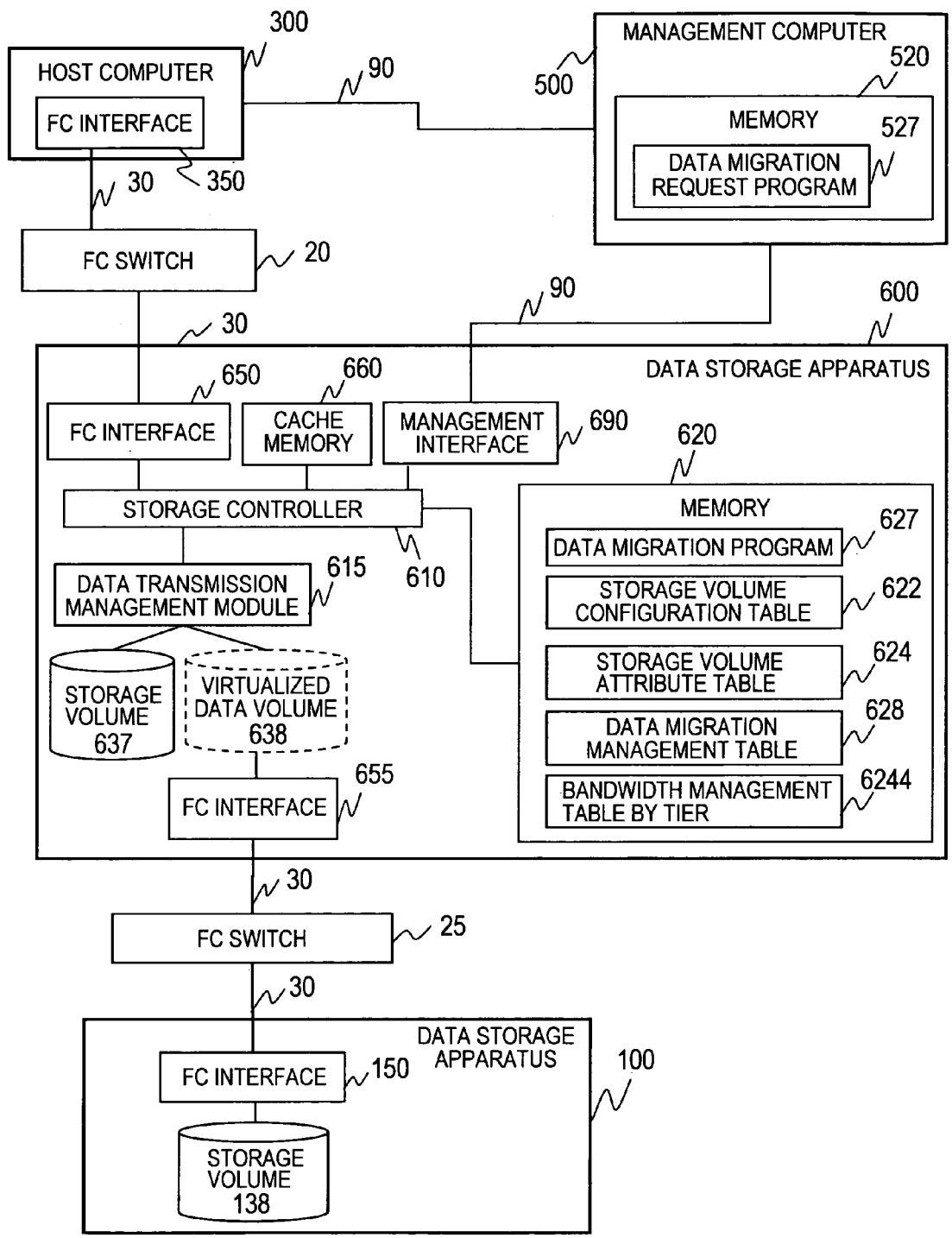
FIG. 31 is a block diagram showing a configuration of a computer system according to a third embodiment of this invention.

FIG. 31 is a block diagram showing a configuration of the computer system according to the third embodiment.

In the system of FIG. 31, a host computer 300 and a data storage apparatus 600 are interconnected via an FC switch 20. Data storage apparatuses 600 and 100 are interconnected via an FC switch 25. The apparatuses 600 and 100 are tiered. The data storage apparatus 600 can provide its own storage volume to the host computer 300 or a storage volume of the data storage apparatus 100 as a storage volume of the data storage apparatus 600 to the host computer 300. The host computer 300 and the data storage apparatuses 600 and 100 are connected to a management computer 500 via a management network 90.

The data storage apparatus 600 includes a data migration program 627. The data storage apparatus 600 further includes a storage volume configuration table 622, a storage volume attribute table 624, a data migration management table 628, and a bandwidth management table 6244 by tier. The data migration program 627 controls data migration between storage volumes. Upon reception of a data migration request from the management computer 500, the data migration management program 627 executes the control of data migration by using the data migration management table 628.

The management computer 500 includes a data migration request issuance program 527 disposed to request data migration between the storage volumes. The data migration request issuance program 527 requests the data storage apparatus 600 to migrate data between the storage volumes via the management network 90.

FIG. 32 is an explanatory diagram showing an example of a storage volume attribute table 624 of the data storage apparatus 600. The storage volume attribute table 624 of this embodiment contains a storage volume ID column 1241, a real/virtual flag column 2241, a capacity column 1242, and a storage volume tier column 6241. A storage volume tier indicates a tier of a storage volume having data actually stored therein when seen from the host computer 300. To be specific, for a storage volume present in the data storage apparatus 600 directly connected to the host computer 300, i.e., a storage volume 637, a tier is "1". For a storage volume present in the data storage apparatus 100 via the data storage apparatus 600, i.e., a virtualized data storage volume 638 mapped with a real storage volume 138, a tier is "2".

FIG. 33 is an explanatory diagram showing an example of the data migration management table 628.

The data migration management table 628 manages a state of a process during a data migration process of the storage volume. The data migration management table 628 contains a data migration source storage volume ID column 6281, a virtualized data storage ID column 6282, and a data migration source storage volume ID column 6283. The data migration management table 628 is managed by the data migration management program 625 which has received a data migration request from the management computer 500. The data migration program 625 creates this table regarding a storage volume of a migration target at the time of starting a data migration process, and stores the data until completion of the migration process. Upon completion of the data migration, the data migration program 625 discards the data migration management table 628.

FIG. 34 is an explanatory diagram showing an example of the bandwidth management table 6244 by tier.

The bandwidth management table 6244 by tier contains a storage volume tier column 6245 and a data access rate (bandwidth) column 6246. The storage volume column is a column for storing a value corresponding to a storage volume tier of the storage volume attribute table 624. The data access rate (bandwidth) column is a column indicating a bandwidth set according to the storage volume tier of the storage volume. For example, in the example of FIG. 34, a bandwidth is set to "60%" for a storage volume of a storage volume tier "1", and a bandwidth is set to "30%" for a storage volume of a storage volume tier "2", and a bandwidth is set to "10%" for a storage volume of a storage volume tier "3 or lower". This table may be preset by a bandwidth setting program by tier (not shown) of the management computer 500.

Next, a mechanism of a bandwidth updating process during data migration will be described.

Figure 35:
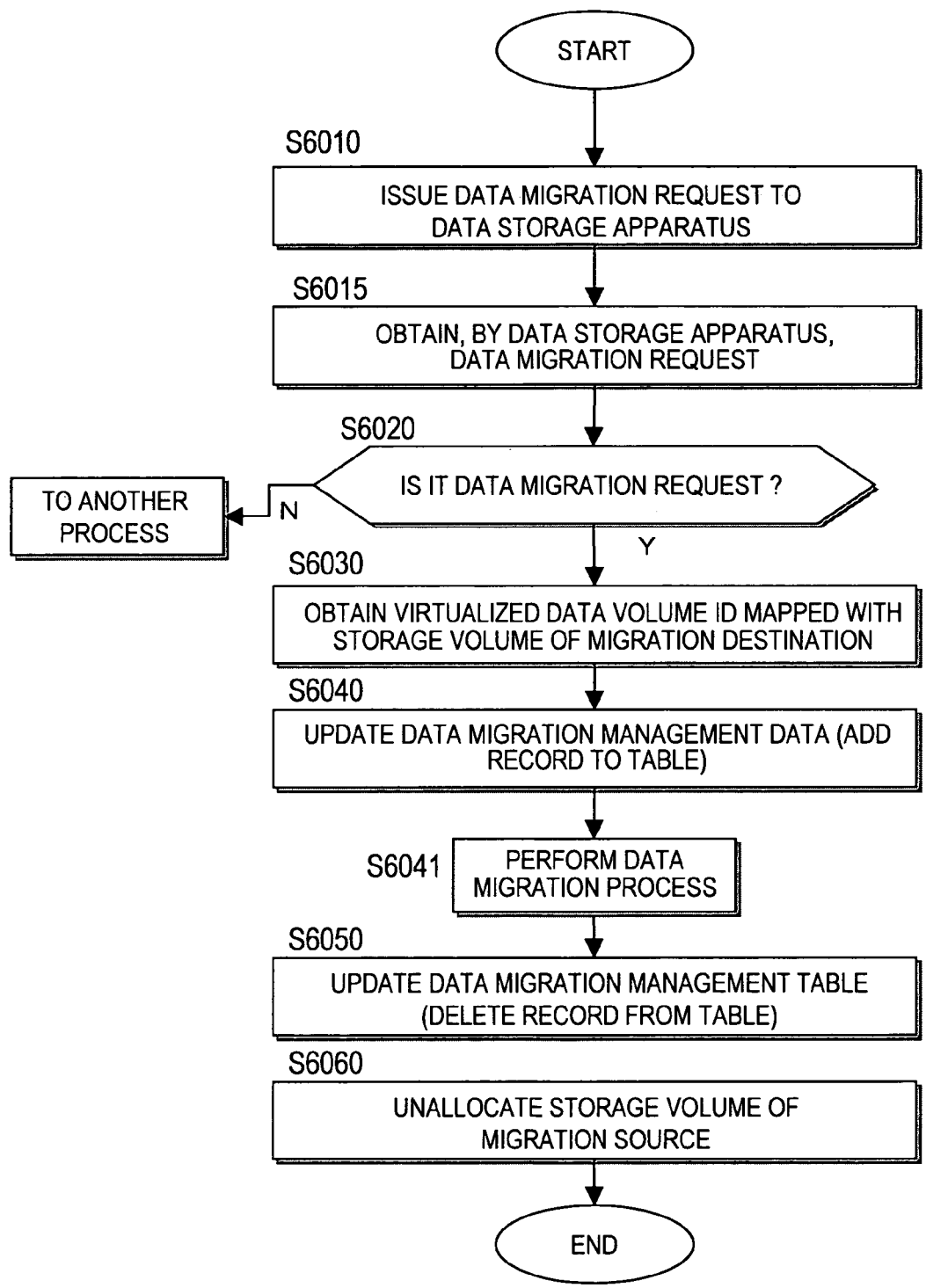
FIG. 35 is a flowchart of a bandwidth updating process during data migration according to the third embodiment of this invention.

FIG. 35 is a flowchart of the bandwidth updating process during the data migration.

The process will be described by way of case where data of a storage volume 637 is migrated to a storage volume 138 of the data storage apparatus 100 when the storage volume 637 of the data storage apparatus 600 allocated to the host computer 300. It is presumed that the storage volume 138 to which the data is migrated is mapped with a virtualized data volume 638. In this case, the storage volume configuration table 622 and the storage volume attribute table 624 of the data storage apparatus 600 are respectively similar in structure to those shown in FIGS. 36 and 32. Description will be made by presuming this state to be an initial state.

In the management computer 500, upon reception of a data migration request from the host computer 300, the data migration request issuance program 527 creates a data migration request. The data migration request issuance program 527 issues the created data migration request to the data storage apparatus 600 (step S6010). This data migration request contains a storage volume ID of a migration source and a storage volume ID of a migration destination. In the data storage apparatus 600, upon reception of the data migration request from the management computer 500, a storage controller 610 obtains contents of the received data migration request (step S6015).

The storage controller 610 judges whether the obtained request is a data migration request (step S6020). If it is judged that the obtained request is not a data migration request, a process corresponding to the request is executed. If it is judged that the obtained request is a data migration request, the storage controller 610 transmits the storage volume ID of the migration source and the storage volume ID of the migration destination contained in the data migration request to the data migration program 627 to request a data migration process.

The data migration program 627 obtains a virtualized data volume ID mapped with the storage volume of the data migration destination from the storage volume configuration table 622 (step S6030). Then, the obtained storage volume ID is stored in a new record of the data migration management table 628 to update the data migration management table 628 (step S6040). To be specific, as shown in FIG. 33, in the data migration management table 628, the storage volume ID of the migration source, the storage volume ID of the migration destination, and the virtualized data volume ID obtained in the step S6030 are respectively stored in the data migration source storage volume ID column, the data migration destination storage volume ID column, and the virtualized data volume ID column.

In the storage controller 610, upon storage of a new record in the data migration management table 628, a data transmission processing module 615 reads data from the storage volume of the data migration source, i.e., the storage volume 637. Then, a data migration process of writing the read data in the virtualized data volume of the migration destination, i.e., the virtualized data volume 638, is executed (S6041).

At this time, the data transmission processing module 615 converts the writing request in the virtualized data volume 638 into a writing request in the storage volume 138 corresponding to the virtualized data volume 638. In other words, data to be written in the storage volume 138 is stored in the storage volume 138 via the FC interface 655 of the data storage apparatus 600 and the FC interface 150 of the data storage apparatus 100.

Upon completion of the writing in the virtualized data volume 638, the data migration program 627 deletes a relevant record of the data migration management table 628 to update the data migration management table 628 (step S6050). To be specific, a record from which data migration has been completed is deleted from the data migration management table 628. The data migration program 627 reports data migration completion to the storage controller 610 upon an end of the data migration.

The storage controller 610 that has received the data migration completion unallocates the storage volume of the migration source (step S6060). To be specific, as shown in FIG. 37, the record of the storage volume 637 is deleted from the storage volume configuration table 622. It should be noted that the step S6060 may not be executed. The storage volume 637 may continuously be stored as a storage volume to be accessed in the host computer 300.

The storage controller 610 that has finished the above process issues a migration completion notification to the management computer. The migration completion notification contains at least a storage volume ID of a virtualized data volume after the data migration. The management computer 500 notifies the obtained storage volume ID of the virtualized data volume to the host computer 300.

According to the third embodiment of this invention, the storage volume ID of the virtualized data volume after the data migration is notified to the host computer. However, an identifier modification program may be disposed in the data storage apparatus 600 to modify the storage volume ID of the virtualized data volume after the data migration to the storage volume ID of the migration source. In this case, the process can be continued without any change from before the data migration by the host computer 300.

A plurality of storage volumes share the FC interface. When reading/writing requests are simultaneously issued from a plurality of host computers to these storage volumes, the data storage apparatus decides bandwidths of the storage volumes according to the storage volume attribute. table 624 and the bandwidth management table 6244 by tier. For example, when reading/writing requests in the storage volume of a storage volume tier "1" and the storage volume of the storage volume tier "2" are overlapped, the data storage apparatus processes the requests at rates of "60%" and "30%", respectively.

The migration of the data of the storage volume to the storage volume of the 2nd tier data storage apparatus causes a reduction in bandwidth of the storage volume, whereby a bandwidth can be set in the storage volume according to importance of the data. Additionally, as a total of bandwidths of the storage volumes attached to the FC interface of the 1st tier data storage apparatus is reduced due to the migration of the storage volume, a new storage volume can be attached to the FC interface of the 1st tier data storage apparatus.

Fourth Embodiment

Next, a computer system of a fourth embodiment will be described. The fourth embodiment is similar to the first embodiment, but different in that the data storage apparatus 100 includes a virtual data storage apparatus. Components similar in functions to those of the first to third embodiments are denoted by similar reference numerals, and description thereof will be omitted.

Figure 38:
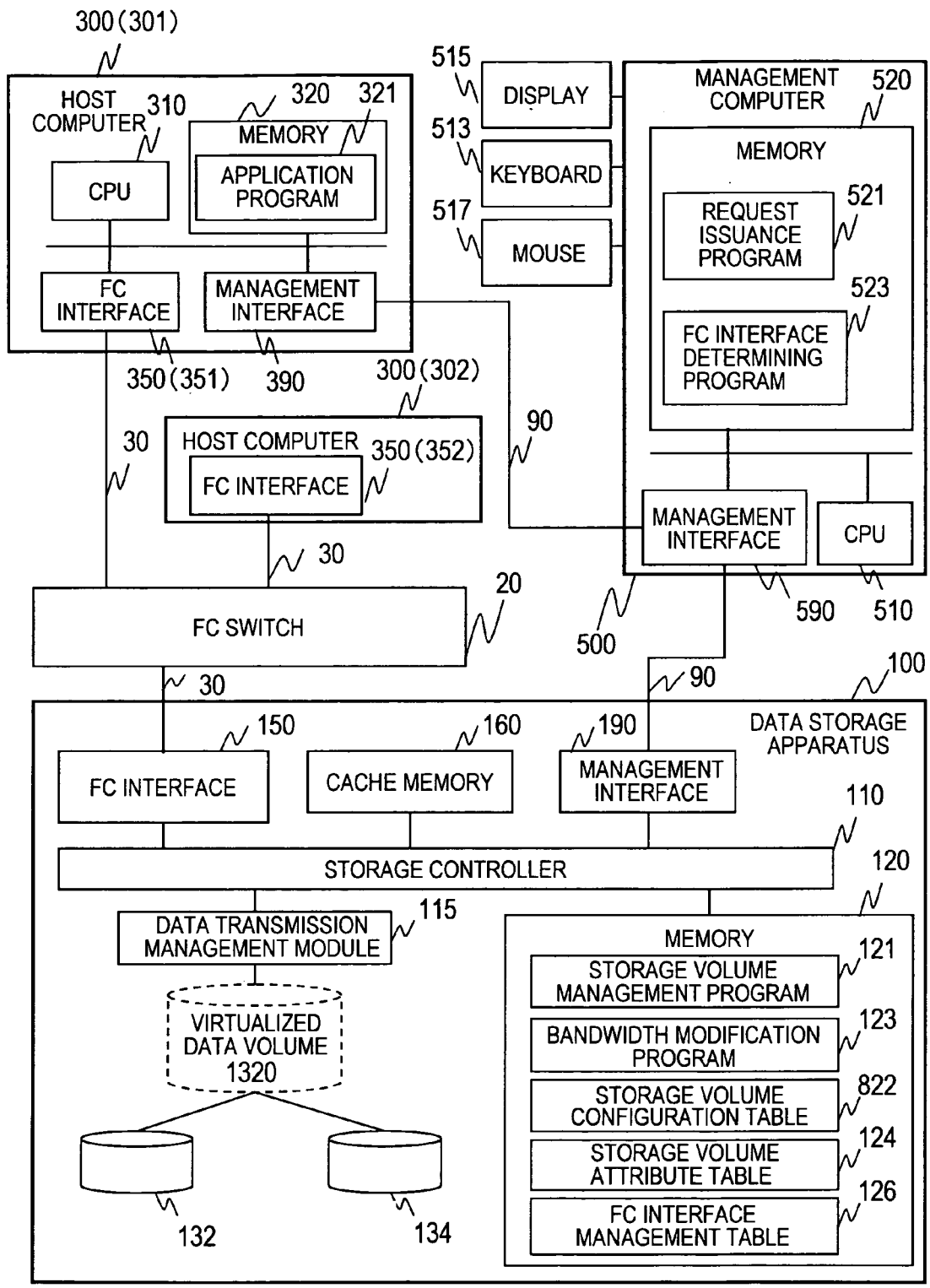
FIG. 38 is a block diagram showing a configuration of the computer system according to the third embodiment of this invention.

FIG. 38 is a block diagram showing a configuration of the computer system of the fourth embodiment of this invention.

The data storage apparatus 100 includes a virtualized data volume 1320 to be accessed by a host computer 300, and storage volumes 132 and 134 to be mapped with the virtualized data volume 1320.

FIG. 39 is an explanatory diagram showing an example of a storage volume configuration table 822 of the fourth embodiment.

As compared with the storage volume configuration table 122 of the first embodiment, the storage volume configuration table 822 further includes a virtualized data volume ID column 8221. A storage volume ID 1222 stores a storage volume ID mapped with the virtualized data volume 1320.

Contents of the storage volume attribute table 124 are similar to those of the first embodiment.

Allocation of a storage volume to the host computer 300 of the fourth embodiment is almost similar to the process of the first embodiment shown in FIGS. 6 to 9.

In the step S1340 of FIG. 8, the storage volume management program 121 stores the storage volume ID and the virtualized data volume ID to update the storage volume configuration table 822. The virtualized data volume 1320 sets an optional ID for each FC interface. Subsequently, the management computer 500 notifies the FC interface ID and the virtualized data volume ID to the host computer 300. Accordingly, the host computer 300 attached to the FC interface 150 accesses the virtualized data volume 1320, whereby a storage volume mapped with the virtualized data volume can be accessed.

Next, a method of modifying a storage volume to be mapped with the virtualized data volume 1320 will be described.

The storage volume configuration table 822 is set as shown in FIG. 39, and a state where the storage volume attribute table 124 is set as shown in FIG. 10 is set as an initial state. In other words, the data storage apparatus 100 includes two storage volumes 132 and 134. The virtualized data volume 1320 is attached to the FC interface 150. The storage volume 132 is mapped with the virtualized data volume 1320, and a host computer WWN 351, i.e., a host computer 301, is set to be accessed. In this state, the storage volume mapped with the virtualized data volume 1320 is modified from the storage volume 132 to the storage volume 134.

The host computer 301 transmits a storage volume switching request to the management computer. This switching request contains a storage volume ID 132 of the switching source, and a storage volume ID 134 of a switching destination. In the management computer 500, a request issuance program 521 obtains the storage volume ID contained in the switching request. Based on the obtained contents, the storage volume switching request is transmitted to the data storage apparatus 100. The storage volume switching request contains the storage volume ID 132 of the switching source and the storage volume ID 134 of the switching destination.

In the data storage apparatus 100, upon reception of the storage volume switching request, the storage volume management program 121 first deletes the storage volume of the switching source from the storage volume configuration table 822. To be specific, as shown in FIG. 40, the storage volume ID mapped with the virtualized data volume ID is deleted to update the storage volume configuration table 822. Next, the storage volume management program 121 stores the storage volume of the switching destination in the storage volume configuration table 822 to update the same. To be specific, as shown in FIG. 41, for the storage volume ID mapped with the virtualized data volume ID "134" which is a storage volume ID of the switching destination contained in the storage volume switching request is stored.

Upon completion of this process, the storage volume management program 121 issues a switching completion notification to the management computer 500. Receiving this notification, the management computer 500 notifies the completion notification to the host computer 301.

Through the above-mentioned process, the storage volume mapped with the virtualized data volume 1320 is modified from the storage volume 132 to the storage volume 134. At this time, a real storage volume is modified from the storage volume 132 to the storage volume 134 even while the storage volume of the data storage apparatus 100 seen from the host computer 301 is not modified from the virtualized data volume 1320. Especially, as data access rates (bandwidths) of the storage volumes 132 and 134 are different from each other, the data access rate (bandwidth) alone seems to have been modified without any change of an access target from the host computer 301.

Next, bandwidth management of access from the host computer 300 to the data storage apparatus 100 of the fourth embodiment will be described.

In the data storage apparatus 100, upon reception of a reading/writing request to the virtualized data volume 1320 from the host computer 300, the storage controller 110 transmits a storage volume ID contained in the reading/writing request to the data transmission management module 115 to request a process to the same.

The data transmission management module 115 refers to the storage volume configuration table 822 to obtain the storage volume ID mapped with the virtualized data volume 1302. Then, the data transmission management module 115 refers to the storage volume attribute table 124 to obtain a bandwidth of the obtained storage volume ID.

As a result, the data transmission management module 115 manages a reading/writing process according to the obtained rate.

Through the above process, the host computers 300 access the same virtualized data volume 1320. However, by the storage volume mapped with the virtualized data volume 1320, each of the host computers 300 accesses the volume by a different bandwidth.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a host computer;
   a storage system coupled to the host computer via a network and including a storage volume to be accessed by the host computer; and
   a management computer for managing the host computer and the storage volume, wherein:
   the storage system includes an interface for processing access to the storage volume from the host computer, and a control unit for controlling allocation of the storage volume to the host computer and;
   the management computer transmits a request of setting a bandwidth corresponding to a ratio of processing access to the each storage volume in the storage system, in the storage volume to the storage system and;
   the control unit sets the bandwidth in the storage volume based on the request from the management computer, and allocates the storage volume having the bandwidth requested by the host computer set therein to the host computer, to be accessed by the host computer to the allocated storage volume and;
   the storage volume includes a first storage volume having a first bandwidth set therein and a second storage volume having a second bandwidth set therein; and
   the control unit releases the allocated first storage volume, allocates the second storage volume having the second bandwidth set therein to the host computer, and sets the allocated second storage volume to be accessed by the host computer, thereby modifying the bandwidth of the storage volume allocated to the host computer from the first bandwidth to the second bandwidth.

2. The computer system according to claim 1, wherein the control unit modifies the bandwidth set in the storage volume to be smaller with a passage of time since setting of the storage volume.

3. The computer system according to claim 1, wherein the interface decides a ratio of processing access for each of a plurality of host computers according to the bandwidth of the each storage volumes, when there are accesses to the each storage volume from the host computers.

4. The computer system according to claim 1, wherein:
   the storage system includes a virtualized data volume to be accessed by the host computer via the interface; and
   the control unit sets the bandwidth in the storage volume based on the request from the management computer, and maps the storage volume with the virtualized data volume, to be accessed by the host computer to the storage volume having the bandwidth set therein.

5. The computer system according to claim 4, wherein:
   the storage volume includes a first storage volume having a first bandwidth set therein and a second storage volume having a second bandwidth set therein; and
   the control unit releases the first storage volume which has been mapped with the virtualized data volume, maps the second storage volume having the second bandwidth set therein with the virtualized data volume, and sets the second storage volume to be accessed by the host computer, thereby modifying the bandwidth of the storage volume allocated to the host computer from the first bandwidth to the second bandwidth.

6. A computer system, comprising:
   a host computer;

a first storage system coupled to the host computer via a first network and including a first storage volume to be accessed by the host computer;

a second storage system including a third storage volume and coupled to the first storage system; and a management computer for managing the host computer and the storage volume, wherein:

the storage system includes an interface for processing access to the storage volume from the host computer, a control unit for controlling allocation of the storage volume to the host computer, and a virtualized data volume accessed by the host computer via the interface; and the control unit sets a first bandwidth in the first storage volume and a third bandwidth in the third storage volume based on a request from the management computer and allocates the first storage volume having the first bandwidth set therein to the host computer, releases the allocated first storage volume when the allocated first storage volume is set to be accessed by the host computer, allocates the virtualized data volume to the host computer, maps the third storage volume with the virtualized data volume, and sets the third storage volume to be accessed by the host computer, thereby modifying the bandwidth of the storage volume allocated to the host computer from the first bandwidth to the third bandwidth.

7. The computer system according to claim 6, wherein when the bandwidth of the storage volume to be allocated to the host computer is changed from the first bandwidth to the third bandwidth, the control unit migrates data stored in the first storage volume having the first bandwidth set therein to the third storage volume having the third bandwidth set therein.

8. A storage system used in a computer system that includes a host computer and a management computer for managing the host computer and a storage volume, the storage system coupled to the host computer via a network, the storage system comprising:

a storage volume to be accessed by the host computer;

an interface for processing access to the storage volume from the host computer; and a control unit for controlling allocation of the storage volume to the host computer and, wherein the control unit sets a bandwidth to be accessed by the host computer via the interface in the storage volume based on a request from the management computer, and allocates the storage volume having the bandwidth requested by the host computer set therein to the host computer, to be accessed by the host computer to the allocated storage volume and wherein;

the storage volume includes a first storage volume having a first bandwidth set therein and a second storage volume having a second bandwidth set therein; and the control unit releases the allocated first storage volume, allocates the second storage volume having the second bandwidth set therein to the host computer, and sets the allocated second storage volume to be accessed by the host computer, thereby modifying the bandwidth of the storage volume allocated to the host computer from the first bandwidth to the second bandwidth.

9. The storage system according to claim 8, wherein the control unit modifies the bandwidth set in the storage volume to be smaller with a passage of time since setting of the storage volume.

10. The storage system according to claim 8, wherein the interface decides a ratio of processing access for each of a plurality of host computers according to the bandwidth of each storage volume when there are accesses to each storage volume from the host computers.

11. The storage system according to claim 8, further comprising a virtualized data volume to be accessed by the host computer via the interface, wherein the control unit sets the bandwidth in the storage volume based on the request from the management computer, and maps the storage volume with the virtualized data volume, to be accessed by the host computer to the storage volume having the bandwidth set therein.

12. The storage system according to claim 11, wherein:

the storage volume includes a first storage volume having a first bandwidth set therein and a second storage volume having a second bandwidth set therein; and the control unit releases the first storage volume which has been mapped to the virtualized data volume, maps the second storage volume having the second bandwidth set therein with the virtualized data volume, and sets the second storage volume to be accessed by the host computer, thereby modifying the bandwidth of the storage volume allocated to the host computer from the first bandwidth to the second bandwidth.

13. The storage system according to claim 8, wherein:

the storage volume includes a first storage volume having a first bandwidth set therein and a second storage volume having a second bandwidth set therein; and the control unit releases the allocated first storage volume upon reception of an allocation changing request from the first volume having the first bandwidth set therein to the second volume having the second bandwidth set therein transmitted from the host computer, allocates the second storage volume having the second bandwidth set therein to the host computer, notifies the allocation change from the first storage volume to the second storage volume to the management computer, and sets the second storage volume to be accessed by the host computer upon reception of a request of setting the interface to enable access of the host computer to the second storage volume transmitted from the management computer, thereby modifying the bandwidth of the storage volume allocated to the host computer from the first bandwidth to the second bandwidth.

* * * * *